US007120876B2

(12) United States Patent
Washington et al.

(10) Patent No.: US 7,120,876 B2
(45) Date of Patent: Oct. 10, 2006

(54) SYSTEM AND METHOD FOR PROGRAMMATICALLY GENERATING A GRAPHICAL PROGRAM IN RESPONSE TO USER INPUT

(75) Inventors: Jeffrey D. Washington, Round Rock, TX (US); Ram Kudukoli, Austin, TX (US); Robert E. Dye, Austin, TX (US); Paul F. Austin, Austin, TX (US)

(73) Assignee: National Instruments Corporation, Austin, TX (US)

( * ) Notice: Subject to any disclaimer, the term of this patent is extended or adjusted under 35 U.S.C. 154(b) by 667 days.

(21) Appl. No.: 09/886,455

(22) Filed: Jun. 20, 2001

(65) Prior Publication Data

US 2001/0034879 A1 Oct. 25, 2001

Related U.S. Application Data

(63) Continuation-in-part of application No. 09/745,023, filed on Dec. 20, 2000, which is a continuation-in-part of application No. 09/518,492, filed on Mar. 3, 2000, said application No. 09/886,455 is a continuation-in-part of application No. 09/595,003, filed on Jun. 13, 2000.

(60) Provisional application No. 60/149,942, filed on Aug. 19, 1999.

(51) Int. Cl.
*G06F 3/00* (2006.01)
(52) U.S. Cl. .................... 715/763; 715/967
(58) Field of Classification Search ............ 345/763, 345/967, 771, 965, 104, 105, 835; 717/104, 717/105; 715/763, 967
See application file for complete search history.

(56) References Cited

U.S. PATENT DOCUMENTS

| 4,831,580 | A |   | 5/1989  | Yamada ................. 717/105 |
|-----------|---|---|---------|-------------------------------|
| 5,005,119 | A |   | 4/1991  | Rumbaugh et al. ........ 718/101 |
| 5,481,741 | A |   | 1/1996  | McKaskle et al. ......... 345/522 |
| 5,742,504 | A |   | 4/1998  | Meyer et al. ............. 700/83 |
| 5,911,070 | A |   | 6/1999  | Solton et al. ............ 717/105 |
| 5,946,485 | A | * | 8/1999  | Weeren et al. ............ 717/109 |
| 5,966,532 | A |   | 10/1999 | McDonald et al. ........ 717/105 |
| 6,053,951 | A |   | 4/2000  | McDonald et al. ........ 717/109 |
| 6,298,474 | B1|   | 10/2001 | Blowers et al. ........... 717/104 |
| 6,331,864 | B1| * | 12/2001 | Coco et al. ............. 345/763 |
| 6,366,300 | B1| * | 4/2002  | Ohara et al. ............ 345/771 |

(Continued)

FOREIGN PATENT DOCUMENTS

EP        1077404        2/2001

OTHER PUBLICATIONS

Vectored Visual Programming, Aug. 1, 1994, IBM Technical Disclosure Bulletin, Aug. 1994, vol. No. 37, Issue No. 8, pp. 367-370.*

(Continued)

*Primary Examiner*—Kieu D. Vu
(74) *Attorney, Agent, or Firm*—Meyertons Hood Kivlin Kowert & Goetzel, P.C.; Jeffrey C. Hood; Jason L. Burgess

(57) ABSTRACT

A system and method for programmatically generating a graphical program or a portion of a graphical program in response to receiving user input. The user input may specify functionality of the graphical program or graphical program portion to be generated. In response to the user input, a graphical program (or graphical program portion) that implements the specified functionality may be programmatically generated. Thus, different graphical programs may be generated, depending on the user input received.

42 Claims, 31 Drawing Sheets

U.S. PATENT DOCUMENTS

| | | | |
|---|---|---|---|
| 6,437,805 B1 | 8/2002 | Sojoodi et al. | |
| 6,453,464 B1 | 9/2002 | Sullivan | |
| 6,493,003 B1 * | 12/2002 | Martinez | 345/781 |
| 6,637,022 B1 | 10/2003 | Weeren et al. | 717/109 |
| 2001/0020291 A1 | 9/2001 | Kudukoli et al. | |
| 2001/0024211 A1 | 9/2001 | Kudukoli et al. | |
| 2001/0034879 A1 | 10/2001 | Washington et al. | |
| 2001/0035879 A1 | 11/2001 | Washington et al. | |
| 2002/0083413 A1 | 6/2002 | Kodosky et al. | |
| 2002/0089538 A1 | 7/2002 | Wenzel et al. | |
| 2002/0129333 A1 | 9/2002 | Chandhoke et al. | |
| 2004/0034696 A1 | 2/2004 | Joffrain et al. | |
| 2004/0034847 A1 | 2/2004 | Joffrain et al. | |
| 2005/0028138 A1 | 2/2005 | Case et al. | |
| 2005/0091602 A1 | 4/2005 | Ramamoorthy et al. | |

OTHER PUBLICATIONS

Object Pallet for Visual Code Generation, Jan. 1, 1995, IBM Technical Disclosure Bulletin, Jan. 1995, vol. No. 38, Issue No. 1, pp. 19-20.*

* cited by examiner

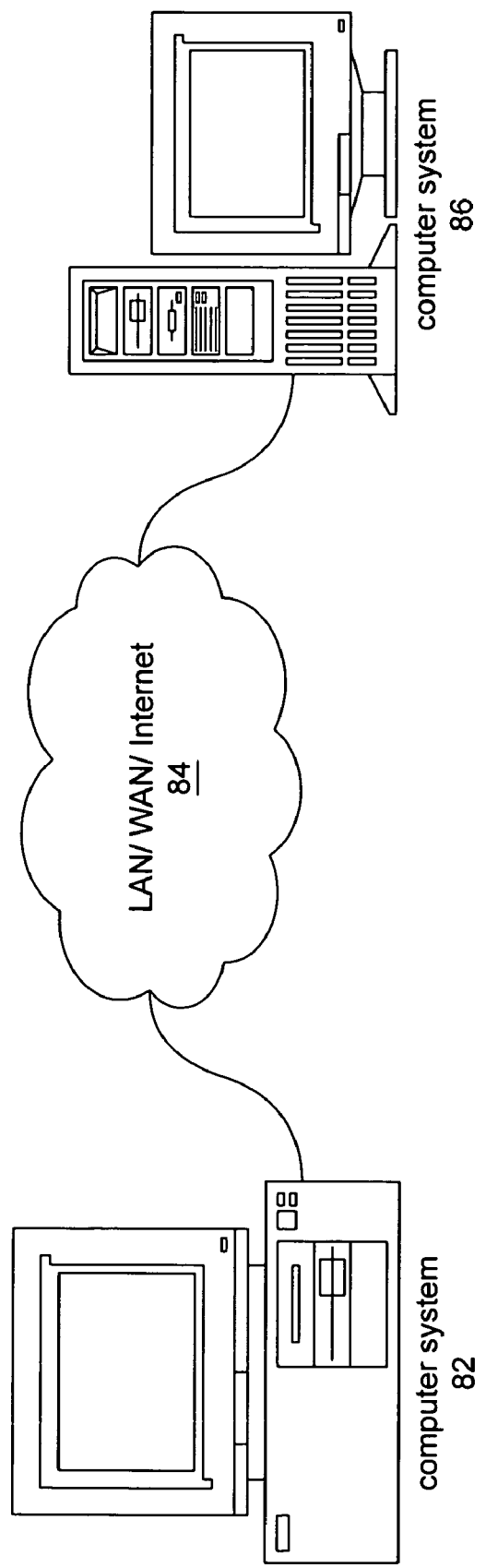

SYSTEM AND METHOD FOR PROGRAMMATICALLY GENERATING A GRAPHICAL PROGRAM IN RESPONSE TO USER INPUT

PRIORITY CLAIM

This application is a continuation-in-part of U.S. patent application Ser. No. 09/745,023 titled, "System and Method for Programmatically Generating a Graphical Program in Response to Program Information," filed Dec. 20, 2000, whose inventors were Ram Kudukoli, Robert Dye, Paul F. Austin, Lothar Wenzel and Jeffrey L. Kodosky, which is a CIP of U.S. patent application Ser. No. 09/518,492 titled "System and Method for Programmatically Creating a Graphical Program", filed Mar. 3, 2000, whose inventors were Ram Kudukoli, Robert Dye, Melanie Jensen, and Yumiko Kawachi, which claims benefit of priority of U.S. provisional Patent Application Ser. No. 60/149,942 titled "System and Method for Programmatically Creating a Graphical Program," filed Aug. 19, 1999, whose inventors were Robert Dye, Melanie Jensen, Ram Kudukoli, and Yumiko Kawachi.

This is also a continuation-in-part of U.S. patent application Ser. No. 09/595,003 titled "System and Method for Automatically Generating a Graphical Program to Implement a Prototype", filed Jun. 13, 2000, whose inventors were Nicolas Vazquez, Jeffrey L. Kodosky, Ram Kudukoli, Kevin L. Schultz, Dinesh Nair, Christophe Caltagirone.

FIELD OF THE INVENTION

The present invention relates to the field of graphical programming, and more particularly to a system and method for programmatically generating a graphical program in response to user input specifying functionality of the graphical program.

DESCRIPTION OF THE RELATED ART

Traditionally, high level text-based programming languages have been used by programmers in writing application programs. Many different high level programming languages exist, including BASIC, C, Java, FORTRAN, Pascal, COBOL, ADA, APL, etc. Programs written in these high level languages are translated to the machine language level by translators known as compilers or interpreters. The high level programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, mathematical steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

Examples of fields in which computer systems are employed to interact with physical systems are the fields of instrumentation, process control, industrial automation, and simulation. Computer measurement and control of devices such as instruments or industrial automation hardware has become increasingly desirable in view of the increasing complexity and variety of instruments and devices available for use. However, due to the wide variety of possible testing and control situations and environments, and also the wide array of instruments or devices available, it is often necessary for a user to develop a custom program to control a desired system.

As discussed above, computer programs used to control such systems traditionally had to be written in text-based programming languages such as, for example, assembly language, C, FORTRAN, BASIC, etc. Traditional users of these systems, however, often were not highly trained in programming techniques and, in addition, text-based programming languages were not sufficiently intuitive to allow users to use these languages without training. Therefore, implementation of such systems frequently required the involvement of a programmer to write software for control and analysis of instrumentation or industrial automation data. Thus, development and maintenance of the software elements in these systems often proved to be difficult.

U.S. Pat. Nos. 4,901,221; 4,914,568; 5,291,587; 5,301,301; and 5,301,336; among others, to Kodosky et al disclose a graphical system and method for modeling a process, i.e., a graphical programming environment which enables a user to easily and intuitively model a process. The graphical programming environment disclosed in Kodosky et al can be considered a higher and more intuitive way in which to interact with a computer. A graphically based programming environment can be represented at a level above text-based high level programming languages such as C, Basic, Java, etc.

The method disclosed in Kodosky et al allows a user to construct a diagram using a block diagram editor. The block diagram may include a plurality of interconnected icons such that the diagram created graphically displays a procedure or method for accomplishing a certain result, such as manipulating one or more input variables and/or producing one or more output variables. In response to the user constructing a diagram or graphical program using the block diagram editor, data structures may be automatically constructed which characterize an execution procedure which corresponds to the displayed procedure. The graphical program may be compiled or interpreted by a computer.

Therefore, Kodosky et al teaches a graphical programming environment wherein a user places or manipulates icons and interconnects or "wires up" the icons in a block diagram using a block diagram editor to create a graphical "program." A graphical program for measuring, controlling, or modeling devices, such as instruments, processes or industrial automation hardware, or for modeling or simulating devices, may be referred to as a virtual instrument (VI). Thus, a user can create a computer program solely by using a graphically based programming environment. This graphically based programming environment may be used for creating virtual instrumentation systems, modeling processes, control, simulation and numerical analysis, as well as for any type of general programming.

In creating a graphical program, a user may create a front panel or user interface panel. The front panel may include various user interface elements or front panel objects, such as controls and/or indicators, that represent or display the respective input and output that will be used by the graphical program or VI, and may include other icons which represent devices being controlled. The front panel may be comprised in a single window of user interface elements, or may comprise a plurality of individual windows each having a user interface element, wherein the individual windows may optionally be tiled together. When the controls and indicators are created in the front panel, corresponding icons or terminals may be automatically created in the block diagram by the block diagram editor. Alternatively, the user can place terminal icons in the block diagram which may cause the display of corresponding front panel objects in the front panel, either at edit time or later at run time. As another example, the front panel objects, e.g., the GUI, may be embedded in the block diagram.

During creation of the block diagram portion of the graphical program, the user may select various function nodes or icons that accomplish his desired result and connect the function nodes together. For example, the function nodes may be connected in one or more of a data flow, control flow, and/or execution flow format. The function nodes may also be connected in a "signal flow" format, which is a subset of data flow. The function nodes may be connected between the terminals of the various user interface elements, e.g., between the respective controls and indicators. Thus the user may create or assemble a graphical program, referred to as a block diagram, graphically representing the desired process. The assembled graphical program may be represented in the memory of the computer system as data structures. The assembled graphical program, i.e., these data structures, may then be compiled or interpreted to produce machine language that accomplishes the desired method or process as shown in the block diagram.

Input data to a graphical program may be received from any of various sources, such as from a device, unit under test, a process being measured or controlled, another computer program, or from a file. Also, a user may input data to a graphical program or virtual instrument using front panel controls. This input data may propagate through the data flow block diagram or graphical program and appear as changes on the output indicators. In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators. Alternatively, the front panel may be used merely to view the input and output, or just the output, and the input may not be interactively manipulable by the user during program execution.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, simulation, machine vision applications, and motion control, among others.

As graphical programming environments have matured and grown in popularity and complexity, it has become increasingly desirable to provide high-level tools which help a user create a graphical program. It also becomes increasingly desirable to integrate graphical programming environments with other applications and programming environments. In order to provide the desired tools or the desired integration, it would be greatly desirable to provide the ability to dynamically or programmatically generate a graphical program or a portion of a graphical program. For example, for various applications, it would be desirable to provide various types of program information to a program, wherein the program information specifies functionality of a graphical program (or portion of a graphical program) to be programmatically generated.

As described above, a user typically creates a graphical program within a graphical programming environment by interactively or manually placing icons or nodes representing the desired blocks of functionality on a diagram, and connecting the icons/nodes together to represent one or more of the data flow, control flow, and/or execution flow of the program. The ability to programmatically generate a graphical program in response to program information would enable a graphical program or graphical program portion to automatically be generated without this type of interactive user input. For example, it would be desirable for the user to be able to specify program functionality at a high level via one or more graphical user interface (GUI) panels, and to then programmatically generate a graphical program or graphical program portion implementing the specified program functionality.

SUMMARY OF THE INVENTION

One embodiment of the present invention comprises a system and method for programmatically generating a graphical program or a portion of a graphical program, in response to receiving user input. The user input may specify functionality of the graphical program or graphical program portion to be generated. A graphical program generation program, referred to herein as a "GPG program", may be executed, wherein the GPG program may be operable to receive the user input. The user input may comprise any type of information that specifies functionality of or aspects of the graphical program desired to be created. In response to the user input, the GPG program may programmatically generate a graphical program (or graphical program portion) that implements the specified functionality. Thus, the GPG program may generate different graphical programs, depending on the user input received.

In programmatically generating a graphical program, the GPG program may programmatically generate a block diagram portion comprising a plurality of connected icons or nodes, wherein the connected icons or nodes may visually or graphically indicate the functionality of the graphical program. The GPG program may also programmatically generate a user interface panel or front panel which may be used to provide input to and/or display output from the graphical program. For example, the GPG program may be constructed to programmatically generate one or more of a LabVIEW program, a VEE program, a Simulink program, etc.

The GPG program that generates the graphical program may be constructed using any of various programming languages, methodologies, or techniques. For example, the GPG program may itself be a graphical program, or the GPG program may be a text-based program, or the GPG program may be constructed using a combination of graphical and text-based programming environments.

Also, the GPG program may have any of various purposes or applications. In one embodiment, the GPG program may include or be associated with a program or application that directly aids the user in creating a graphical program. For example, the GPG program may be included in a graphical programming development environment application. In this case the graphical programming development environment application may be operable to receive user input specifying desired functionality and the GPG program may automatically, i.e., programmatically, add a portion of graphical program code implementing the specified functionality to the user's program. The user input may be received, for example, via one or more "wizard" graphical user interface (GUI) input panels or dialogs enabling the user to specify various options. Such graphical program code generation wizards may greatly simplify the user's task of implementing various operations. As an example, it is often difficult for developers of instrumentation applications to properly implement code to analyze an acquired signal, due to the inherent complexity involved. By enabling the developer to easily specify the desired functionality through a high-level user interface, the GPG program can receive this information and automatically create graphical code to implement the signal analysis. Furthermore, since the graphical code is generated programmatically, the code may be optimized, resulting in an efficient program and a readable block diagram without unnecessary code.

In various embodiments, an association between a generated graphical program and the received user input used in generating the graphical program may be maintained. For example, this association may enable the user to return from the programmatically generated graphical program (or portion) to the GUI input panel(s) originally used to specify the user input, e.g., in order to modify the programmatically generated graphical program (or portion). In one embodiment, a generated graphical program may be "locked", requiring the user to explicitly unlock the graphical program before the graphical program can be modified.

In various embodiments, the GPG program may be operable to generate any of various types of graphical programs. For example, as discussed above, a generated graphical program may be targeted toward a particular graphical programming development environment application. The GPG program may thus utilize proprietary features or create files that are formatted in a manner expected by the graphical programming development environment. This may be desirable or necessary when the graphical programming development environment includes a runtime environment that is required for the created graphical program to execute. Examples of graphical programming development environments include LabVIEW, BridgeVIEW, DasyLab, and DiaDem from National Instruments, VEE from Hewlett Packard, Simulink from The MathWorks, Softwire from Measurement Computing, Inc., Sanscript from Northwoods Software, WiT from Coreco, and Vision Program Manager from PPT Vision, among others.

In various embodiments, the graphical program may be generated using any of various methods or techniques. Generating the graphical program may comprise generating one or more files or data structures defining the graphical program. When a user interactively develops a graphical program from within a graphical programming environment, the graphical programming environment may create one or more program files. For example, the program files may specify information such as a set of nodes that the graphical program uses, interconnections among these nodes, programmatic structures such as loops, etc. In other cases, the program files may store various data structures, e.g., in binary form, which the graphical programming environment uses to directly represent the graphical program. Thus, in programmatically generating the graphical program, the GPG program may programmatically generate one or more files or data structures representing the graphical program, wherein these files may be structured or formatted appropriately for a particular graphical programming environment.

In one embodiment, a graphical programming development environment may provide an application programming interface (API) which the GPG program can use to programmatically generate the graphical program. For example, for each node, user interface element, or other object of the graphical program, the API may be called to programmatically add the object to the graphical program, connect the object to other objects of the graphical program, etc. Thus, any necessary files or other constructs needed by the graphical programming environment in order to use the generated graphical program may be automatically created as a result of calling the API.

BRIEF DESCRIPTION OF THE DRAWINGS

A better understanding of the present invention can be obtained when the following detailed description of the preferred embodiment is considered in conjunction with the following drawings, in which:

FIG. 1 illustrates a computer system connected through a network to a second computer system;

Figure 2A:
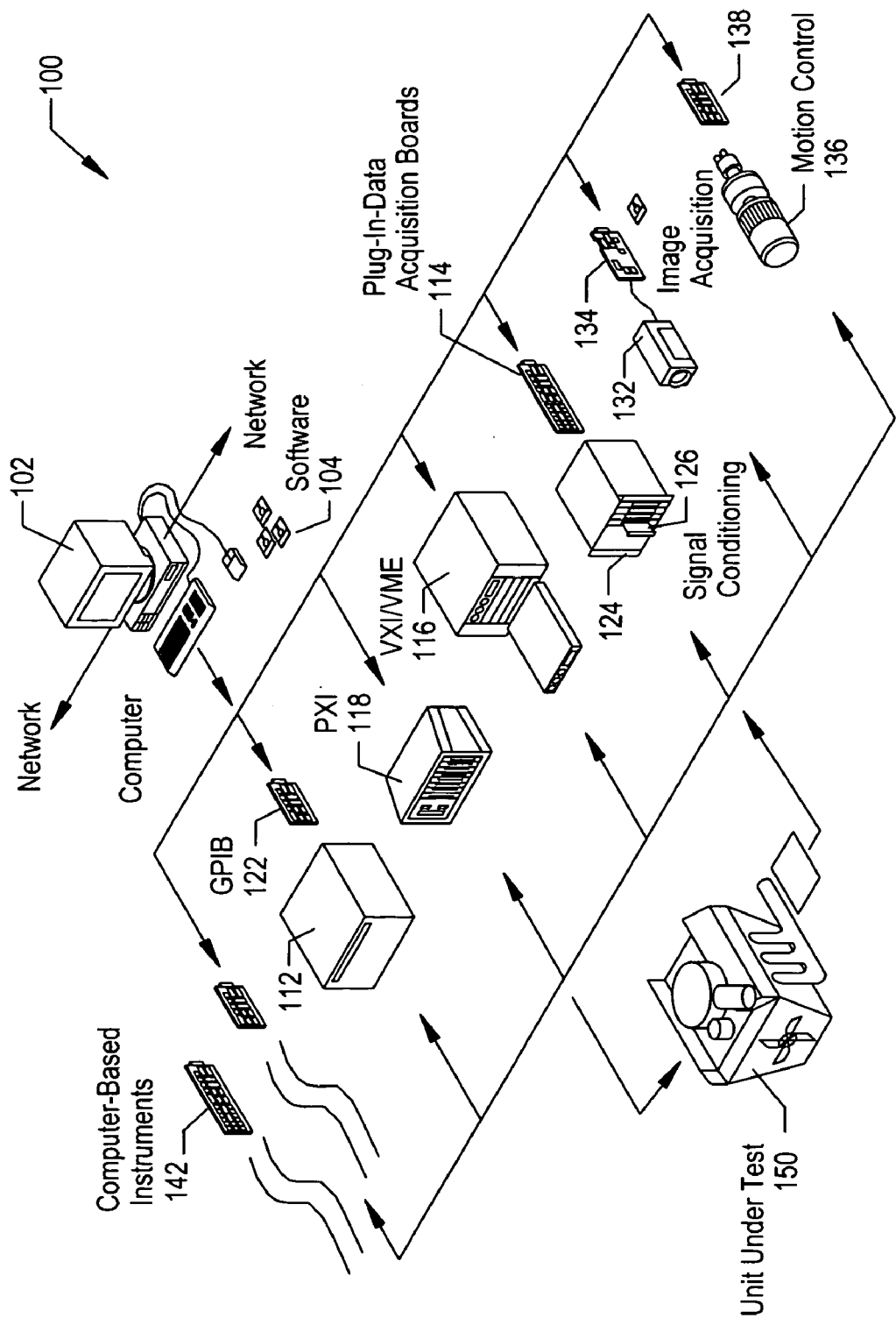
FIGS. 2A and 2B illustrate representative instrumentation and process control systems including various I/O interface options.

While the invention is susceptible to various modifications and alternative forms specific embodiments are shown by way of example in the drawings and are herein described in detail. It should be understood however, that drawings and detailed description thereto are not intended to limit the invention to the particular form disclosed, but on the contrary the invention is to cover all modifications, equivalents and alternative following within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein.

U.S. Pat. No. 5,481,741 titled "Method and Apparatus for Providing Attribute Nodes in a Graphical Data Flow Environment," issued on Jan. 2, 1996.

U.S. Pat. No. 6,064,812 titled "System and Method for Developing Automation Clients Using a Graphical Data Flow Program," issued on May 16, 2000.

U.S. Pat. No. 6,102,965 titled "System and Method for Providing Client/Server Access to Graphical Programs," issued on Aug. 15, 2000.

U.S. patent application Ser. No. 09/136,123 titled "System and Method for Accessing Object Capabilities in a Graphical Program" filed Aug. 18, 1998.

U.S. patent application Ser. No. 09/518,492 titled "System and Method for Programmatically Creating a Graphical Program", filed Mar. 3, 2000.

U.S. patent application Ser. No. 09/595,003 titled "System and Method for Automatically Generating a Graphical Program to Implement a Prototype," filed Jun. 13, 2000.

U.S. patent application Ser. No. 09/745,023 titled "System and Method for Programmatically Generating a Graphical Program in Response to Program Information," filed Dec. 20, 2000.

U.S. patent application Ser. No. 08/912,445 titled "Embedded Graphical Programming System" filed on Aug. 18, 1997, whose inventors were Jeffrey L. Kodosky, Darshan Shah, Samson DeKey, and Steve Rogers.

U.S. patent application Ser. No. 08/912,427 titled "System and Method for Converting Graphical Programs Into Hardware Implementations" filed on Aug. 18, 1997, whose inventors were Jeffrey L. Kodosky, Hugo Andrade, Brian Keith Odom, and Cary Paul Butler.

FIG. 1—Computer System Connected to a Network

FIG. 1 illustrates an exemplary computer network in which a computer system 82 is connected through a network 84 to a second computer system 86. The computer system 82 and the second computer system 86 can be any of various types, as desired. The network 84 can also be any of various types, including a LAN (local area network), WAN (wide area network), or the Internet, among others.

The computer system 82 may include or store a computer program, referred to herein as a graphical program generation program, or a "GPG program", that is operable to receive program information and programmatically generate a graphical program based on the program information. One embodiment of a method for programmatically generating a graphical program is described below.

In one embodiment, the GPG program may be implemented as a self-contained program or application that includes all necessary program logic for generating the graphical program. In another embodiment, the GPG program may comprise a client portion and a server portion (or client program and server program), wherein the client portion may request or direct the server portion to generate the graphical program. For example, the client portion may utilize an application programming interface (API) provided by the server portion in order to generate the graphical program. In other words, the client portion may perform calls to the API provided by the server portion, and the server portion may execute functions or routines bound to these calls to generate the graphical program. In one embodiment, the server portion may be an instance of a graphical programming development environment application. For example, the LabVIEW graphical programming development environment application enables client programs to interface with a LabVIEW server in order to programmatically generate or modify graphical programs.

As used herein, the term "GPG program" is intended to include any of various implementations of a program (or programs) that are executable to programmatically generate a graphical program based on received program information. For example, the term "GPG program" is intended to include an embodiment in which the GPG program is a self-contained program or application (not implemented as a client/server program) that includes all necessary program logic for programmatically generating a graphical program. The term "GPG program" is also intended to include an embodiment in which a combination of a client portion (or client program) and server portion (or server program) operate together to programmatically generate the graphical program. The term "GPG program" is also intended to include other program implementations.

In an embodiment in which a client program interfaces with a server program to generate the graphical program, the server program may execute on the same computer system as the client program or may execute on a different computer system, e.g., a different computer system connected via a network. For example, in FIG. 1, the client program may execute on the computer system 82, and the server program may execute on the computer system 86. In this case, the graphical program, e.g., files representing the graphical program may be created on the computer system 82, or 86, or on a different computer system.

It is noted that the GPG program may be implemented using any of various programming technologies or methodologies. Where the GPG program is implemented as client and server programs, each of these programs may utilize procedure-based techniques, component-based techniques, and/or object-oriented techniques, among others. The programs may be written using any combination of text-based or graphical programming languages. Also, the programs may be written using distributed modules or components so that each program may reside on any combination of computer system 82, computer system 86, and other computer systems connected to the network 84. Also, in various embodiments, the client program may interface with the server program through a proxy software component or program.

Figure 2B:
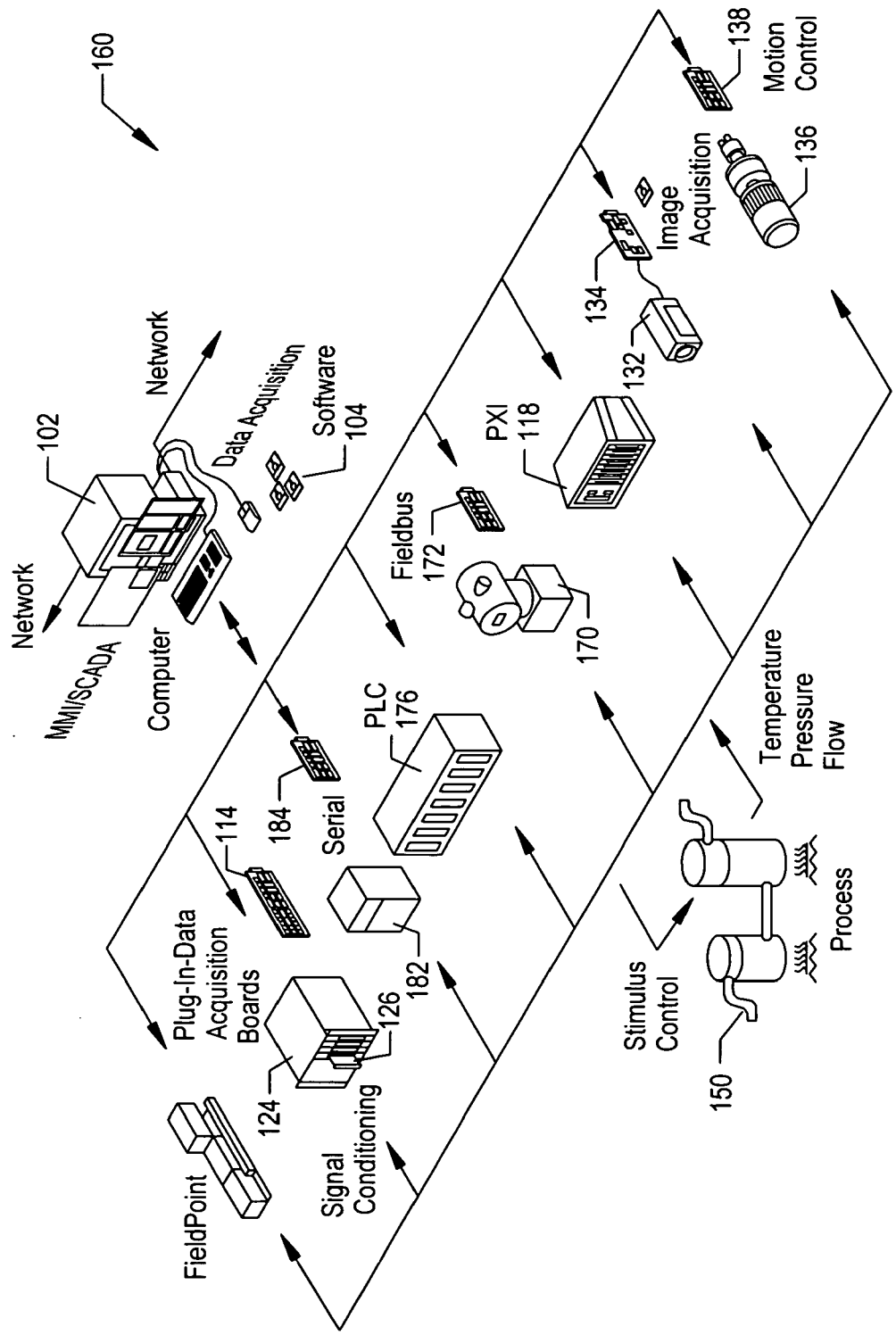

FIGS. 2A and 2B—Instrumentation and Industrial Automation Systems

FIGS. 2A and 2B illustrate exemplary systems which may store or use a GPG program and/or a server program which are operable to programmatically generate a graphical program. Also, these systems may execute a programmatically generated graphical program. For example, the graphical program may perform an instrumentation function, such as a test and measurement function or an industrial automation function. It is noted that the GPG program, the server program, and/or a generated graphical program may be stored in or used by any of various other types of systems as desired and may implement any function or application as desired. Thus, FIGS. 2A and 2B are exemplary only.

FIG. 2A illustrates an exemplary instrumentation control system 100. The system 100 comprises a host computer 102 which connects to one or more instruments. The host computer 102 may comprise a CPU, a display screen, memory, and one or more input devices such as a mouse or keyboard as shown. The computer 102 connects through the one or more instruments to analyze, measure, or control a unit under test (UUT) or process 150. In one embodiment, the computer 102 may be either of the computers 82 or 86 shown in FIG. 1, which as described above are operable to programmatically generate graphical programs based on received information. Also, in one embodiment, the computer 102 may execute a generated graphical program, such as a graphical program that controls or models one or more of the connected instruments.

The one or more instruments may include one or more of a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 may be coupled to the computer 102 via the GPIB interface card 122 comprised in the computer 102. In a similar manner, the video device 132 may be coupled to the computer 102 via the image acquisition card 134, and the motion control device 136 may be coupled to the computer 102 through the motion control interface card 138. The data acquisition board 114 may be coupled to the computer 102, and may interface through signal conditioning circuitry 124 to the UUT. The signal conditioning circuitry 124 preferably comprises an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or MicroChannel bus slot provided by the computer 102. However, these cards 122, 134, 138 and 114 are shown external to computer 102 for illustrative purposes.

The VXI chassis or instrument 116 may be coupled to the computer 102 via a VXI bus, MXI (e.g., MXI-3) bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument is preferably coupled to the computer 102 through the computer's PCI bus.

A serial instrument (not shown) may also be coupled to the computer 102 through a serial port, such as an RS-232 port, USB (Universal Ser. bus) or IEEE 1394 or 1394.2 bus, provided by the computer 102.

In typical instrumentation control systems an instrument will not be present of each interface type, and in fact many systems may only have one or more instruments of a single interface type, such as only GPIB instruments. The one or more instruments are coupled to the unit under test (UUT) or process 150, or are coupled to receive field signals, typically generated by transducers. The system 100 may be used in a data acquisition and control application, in a test and measurement application, a process control application, a man-machine interface application, or other types of applications.

FIG. 2B illustrates an exemplary industrial automation system 160. The industrial automation system 160 is similar to the instrumentation or test and measurement system 100 shown in FIG. 2A. Elements which are similar or identical to elements in FIG. 2A have the same reference numerals for convenience. The system 160 may comprise a computer 102 which connects to one or more devices or instruments. The computer 102 may comprise a CPU, a display screen, memory, and one or more input devices such as a mouse or keyboard as shown. The computer 102 may connect through the one or more devices to a process or device 150 to perform an automation function, such as MMI (Man Machine Interface), SCADA (Supervisory Control and Data Acquisition), portable or distributed data acquisition, process control, advanced analysis, or other control. In one embodiment, the computer 102 may be either of the computers 82 or 86 shown in FIG. 1, which as described above are operable to programmatically generate graphical programs based on received information. Also, in one embodiment, the computer 102 may execute a generated graphical program, such as a graphical program that is involved with the automation function performed by the automation system 160.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

The DAQ card 114, the PXI chassis 118, the video device 132, and the image acquisition card 136 are preferably connected to the computer 102 as described above. The serial instrument 182 is coupled to the computer 102 through a serial interface card 184, or through a serial port, such as an RS-232 port, USB, or IEEE 1394 or 1394.2 provided by the computer 102. The PLC 176 couples to the computer 102 through a serial port, Ethernet port, or a proprietary interface. The fieldbus interface card 172 is preferably comprised in the computer 102 and interfaces through a fieldbus network to one or more fieldbus devices. Each of the DAQ card 114, the serial card 184, the fieldbus card 172, the image acquisition card 134, and the motion control card 138 are typically plugged in to an I/O slot in the computer 102 as described above. However, these cards 114, 184, 172, 134, and 138 are shown external to computer 102 for illustrative purposes. In typical industrial automation systems a device will not be present of each interface type, and in fact many systems may only have one or more devices of a single interface type, such as only PLCs. The devices are coupled to the device or process 150.

Referring again to FIGS. 2A and 2B, the computer system(s) 102 preferably includes a memory medium(s) on which one or more computer programs or software components according to one embodiment of the present invention are stored. For example, the memory medium may store a GPG program which is executable to receive program information and programmatically generate a graphical program based on the information. The same or a different memory medium may also store a server program with which a client portion of the GPG program interfaces in order to generate the graphical program. The memory medium may also store a programmatically generated graphical program. The memory medium may also store a graphical programming development environment application operable execute or edit the programmatically generated graphical program. It is noted that various of these software programs may be stored on different computer systems, as described above with reference to FIG. 1. Also, in various embodiments, various of the above software programs may be implemented or combined in different ways. For example, a graphical programming development environment application may implement the server program with which a client program interfaces to programmatically generate a graphical program.

The term "memory medium" is intended to include an installation medium, e.g., a CD-ROM, floppy disks 104, or tape device, a computer system memory or random access memory such as DRAM, SRAM, EDO RAM, Rambus RAM, etc., or a non-volatile memory such as a magnetic media, e.g., a hard drive, or optical storage. The memory medium may comprise other types of memory as well, or combinations thereof.

In addition, the memory medium may be located in a first computer in which the programs are executed, or may be located in a second different computer which connects to the first computer over a network, such as the Internet. In the latter instance, the second computer may provide the program instructions to the first computer for execution. Also, the computer system 102 may take various forms, including a personal computer system, mainframe computer system, workstation, network appliance, Internet appliance, personal digital assistant (PDA), television system or other device. In general, the term "computer system" can be broadly defined to encompass any device having at least one processor which executes instructions from a memory medium.

In one embodiment, the GPG program and/or the resulting graphical program that is programmatically generated may be designed for data acquisition/generation, analysis, and/or display, and for controlling or modeling instrumentation or industrial automation hardware. For example, in one embodiment, the National Instruments LabVIEW graphical programming development environment application, which provides specialized support for developers of instrumentation applications, may act as the server program. In this embodiment, the client program may be a software program that receives and processes program information and invokes functionality of the LabVIEW graphical programming development environment. The client program may also be a program involved with instrumentation or data acquisition.

However, it is noted that the present invention can be used for a plethora of applications and is not limited to instrumentation or industrial automation applications. In other words, FIGS. 2A and 2B are exemplary only, and graphical programs for any of various types of purposes may be generated by a GPG program designed for any of various types of purposes, wherein the programs are stored in and execute on any of various types of systems. Various examples of GPG programs and generated graphical programs are discussed below.

Figure 3:
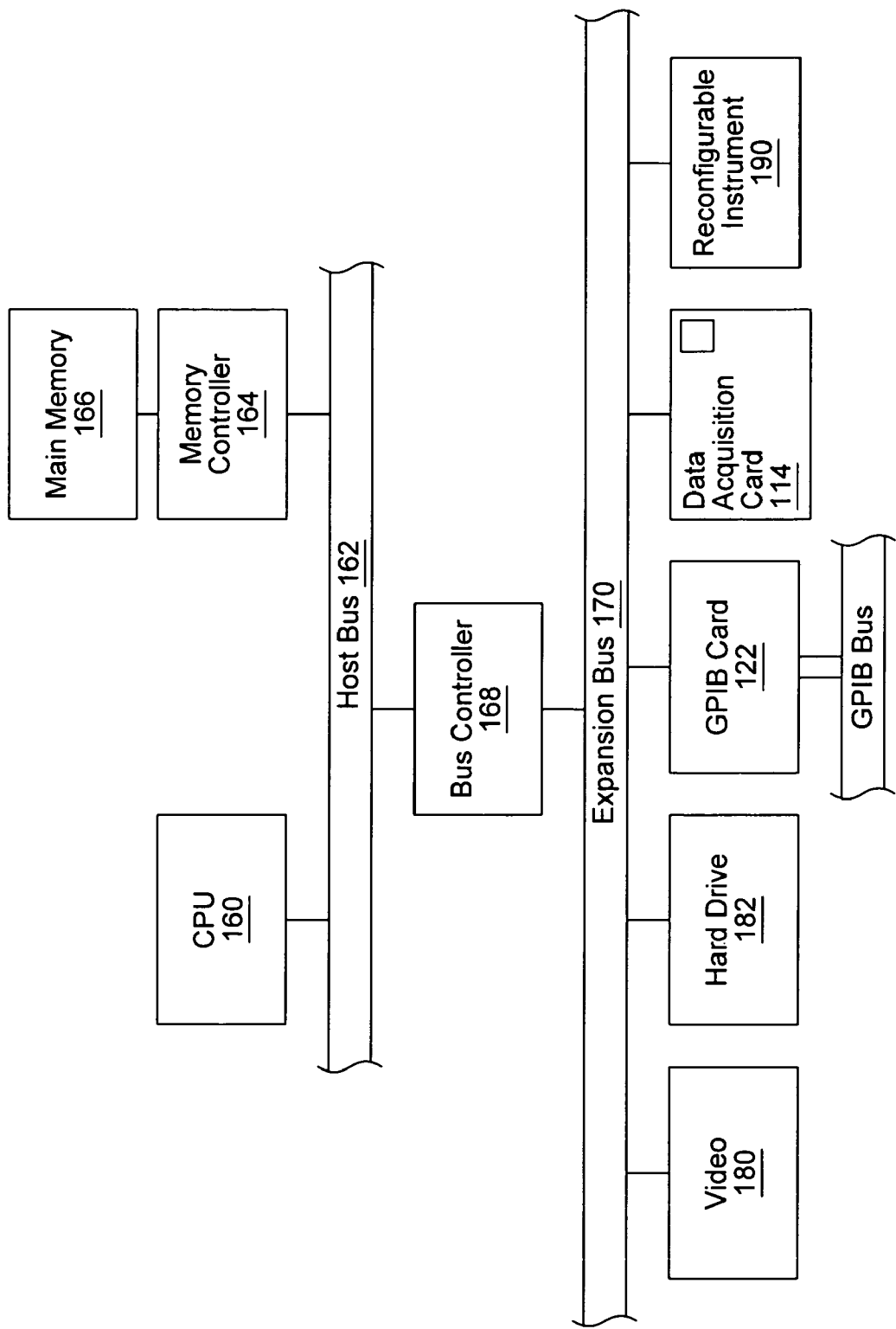
FIG. 3 is a block diagram of the computer system of FIGS. 1, 2A and 2B.

FIG. 3—Computer System Block Diagram

FIG. 3 is a block diagram of the computer system illustrated in FIGS. 1, 2A and 2B. It is noted that any type of computer system configuration or architecture can be used as desired, and FIG. 3 illustrates a representative PC embodiment. It is also noted that the computer system may be a general purpose computer system as shown in FIGS. 2A and 2B, a computer implemented on a VXI card installed in a VXI chassis, a computer implemented on a PXI card installed in a PXI chassis, or other types of embodiments. The elements of a computer not necessary to understand the present invention have been omitted for simplicity.

The computer 102 includes at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164.

The main memory 166 may store computer programs according to one embodiment of the present invention, such as described above with reference to FIGS. 2A and 2B. The main memory 166 may also store operating system software as well as other software for operation of the computer system, as well known to those skilled in the art. Computer programs stored in the main memory 166 may implement one or more of the methods described below.

The host bus 162 is coupled to an expansion or input/output bus 170 by means of a bus controller 168 or bus bridge logic. The expansion bus 170 is preferably the PCI (Peripheral Component Interconnect) expansion bus, although other bus types can be used. The expansion bus 170 includes slots for various devices such as the data acquisition board 114 (of FIG. 2A) and a GPIB interface card 122 which provides a GPIB bus interface to the GPIB instrument 112 (of FIG. 2A). The computer 102 further comprises a video display subsystem 180 and hard drive 182 coupled to the expansion bus 170.

As shown, a reconfigurable instrument 190 may also be connected to the computer 102. The reconfigurable instrument 190 may include configurable logic, such as a programmable logic device (PLD), e.g., an FPGA, or a processor and memory, which may execute a real time operating system. According to one embodiment of the invention, a programmatically generated graphical program may be downloaded and executed on the reconfigurable instrument 190. For example, a graphical programming development environment with which the graphical program is associated may provide support for downloading a graphical program for execution on configurable logic in a real time system. In various embodiments, the configurable logic may be comprised on an instrument or device connected to the computer through means other than an expansion slot, e.g., the instrument or device may be connected via an IEEE 1394 bus, USB, or other type of port. Also, the configurable logic may be comprised on a device such as the data acquisition board 114 or another device shown in FIG. 2A.

Figure 4:
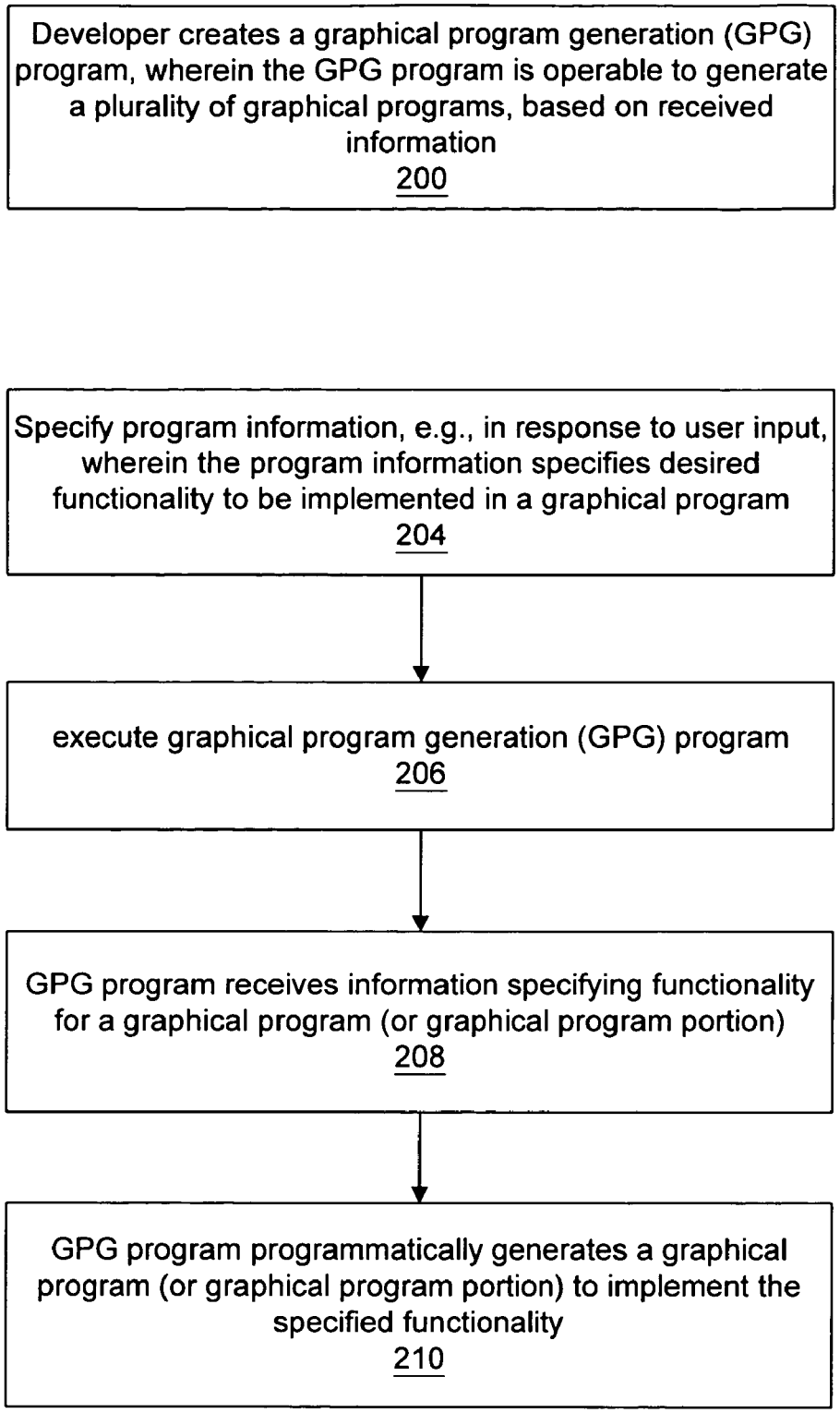
FIG. 4 is a flowchart diagram illustrating one embodiment of a method for programmatically generating a graphical program in response to receiving program information.

FIG. 4—Programmatic Creation of a Graphical Program

In prior systems, a user interactively or manually creates or edits a graphical program. For example, the user may interactively add various objects or icons to a graphical program block diagram, connect the objects together, etc. In contrast, one embodiment of the present invention comprises a system and method for programmatically generating a graphical program (or portion of a graphical program) without requiring this type of user interaction.

FIG. 4 is a flowchart diagram illustrating one embodiment of a method for programmatically generating a graphical program. In step 200, a graphical program generation (GPG) program may be created, wherein the GPG program is operable to programmatically generate a plurality of graphical programs, based on received information. As described below, the GPG program may be associated with any of various purposes or applications. Also, as discussed above, the GPG program may be implemented in various ways, e.g., using graphical and/or text-based programming environments. For example, the GPG program may be a text-based program, such as a program written using C, C++, Java, Basic, Visual Basic, FORTRAN, Pascal, or another text-based programming language. Also, the GPG program may itself be a graphical program. For example, the GPG program may be a graphical program interactively created in response to user input.

As described below, the GPG program may be implemented based on a client/server programming model. The client portion may call an application programming interface (API) provided by the server portion usable for programmatically creating the new graphical program. For example, a text-based GPG program may include text-based code for calling various API functions or methods, while a graphical GPG program may include various graphical nodes which are operable to invoke functions of the API. The creation of the GPG program may be performed by a developer, wherein the GPG program may then be used as a tool for the programmatic creation of graphical programs by users or other developers.

As shown in step 204, program information for the new graphical program (or graphical program portion) to be generated may be specified, e.g., in response to user input. As described below, this program information may comprise any of various types of information and may specify functionality of the new graphical program.

In step 206, the GPG program may be executed. The GPG program may be executed in any type of computer system.

In step 208, the GPG program may receive the program information specifying the functionality for the graphical program or graphical program portion. As described below, the GPG program may receive any type of information from any type of source.

In step 210, the GPG program may programmatically generate a graphical program or graphical program portion to implement the functionality specified by the received information. In other words, in response to receiving the information in step 208, the GPG program may programmatically generate a new graphical program or program portion based on the information. The graphical program may be programmatically generated with little or no user input received during this creating. In one embodiment, the graphical program is programmatically generated with no user input required. In another embodiment, the user may be prompted for certain decisions during programmatic generation, such as the type of graphical program, the look and feel of a user interface for the graphical program, the number or degree of comments contained within the graphical program, etc.

In response to receiving the information in step 208, the GPG program may process the information in order to determine how to generate the graphical program, i.e., in order to determine appropriate graphical source code for the program, an appropriate user interface for the program, etc. As described below, the determination of how to generate the graphical program may depend on a combination of the received information and/or the program logic of the GPG program (i.e., what the GPG program is operable to do with the received information).

In generating the determined graphical program, the GPG program may specify the inclusion of various objects in the new graphical program. For example, the new graphical program may have a diagram portion including a plurality of interconnected nodes which visually indicate functionality of the new graphical program. The new graphical program may also have a user interface portion including various user interface objects, such as one or more user interface panels having controls for specifying user input to the graphical program and/or indicators for displaying output from the graphical program. The GPG program may also specify other aspects of the graphical program, such as: interconnections between diagram objects, connections between diagram objects and user interface objects, positions of objects, sizes of objects, input/output terminals or terminal names for diagram objects, comments for diagram objects, and properties or configuration of objects (e.g., configuration of data types, parameters, etc.), among other aspects of the graphical program.

In various embodiments, the GPG program may generate a graphical program of any of various types. For example, the GPG program may generate the graphical program specifically so that a particular graphical programming development environment is operable to edit and/or execute the graphical program.

In one embodiment, the GPG program may be a self-contained program that includes all executable logic necessary for programmatically generating the new graphical program. However, in the preferred embodiment, the GPG program utilizes a client/server programming model, in which the client portion processes the program information and determines the graphical program to be generated based on the program information (i.e., determines the function nodes or other objects to be included in the program, the interconnections among these nodes/objects, etc.). The client portion may then call an API provided by the server portion to request the server portion to perform the actual creation of the new graphical program, e.g., by creating files and/or other data structures representing the new graphical program. The server portion may execute on the same computer system as the client portion or may execute on a different computer system, e.g., a different computer system connected by a network. In one embodiment, the server portion may be an instance of a graphical programming development environment application, which provides an API enabling client programs to programmatically create and/or edit graphical programs.

The method of FIG. 4 is illustrated and is described above in terms of generating a new graphical program. It is noted that a similar method may be used to modify an existing graphical program, e.g., in order to add functionality to the program, such as functionality specified by user input received by a user interface wizard. In other words, instead of specifying creation of a new graphical program, the GPG program may specify the modification of an existing graphical program. When executed, the GPG program is then operable to programmatically modify the existing graphical program. For example, the GPG program may include a reference to the existing graphical program and may perform various API calls to modify the graphical program, e.g., by adding one or more objects to the graphical program, changing connections between graphical program objects, changing various properties of graphical program objects, etc.

It is noted that FIG. 4 represents one embodiment of a method for programmatically generating a graphical program, and various steps may be added, reordered, combined, omitted, modified, etc. For example, as described above, the GPG program may include or may be associated with an application that the user uses to specify the program information. For example, such an application may enable the user to specify a state diagram, a test executive sequence, a prototype, etc., on which to base the graphical program. Thus, executing the GPG program in step 206 may comprise invoking a routine or program associated with this application, e.g., in response to the user selecting a menu option included in the application's user interface. In other embodiments, the user may launch the GPG program as an independent application.

Figure 5:
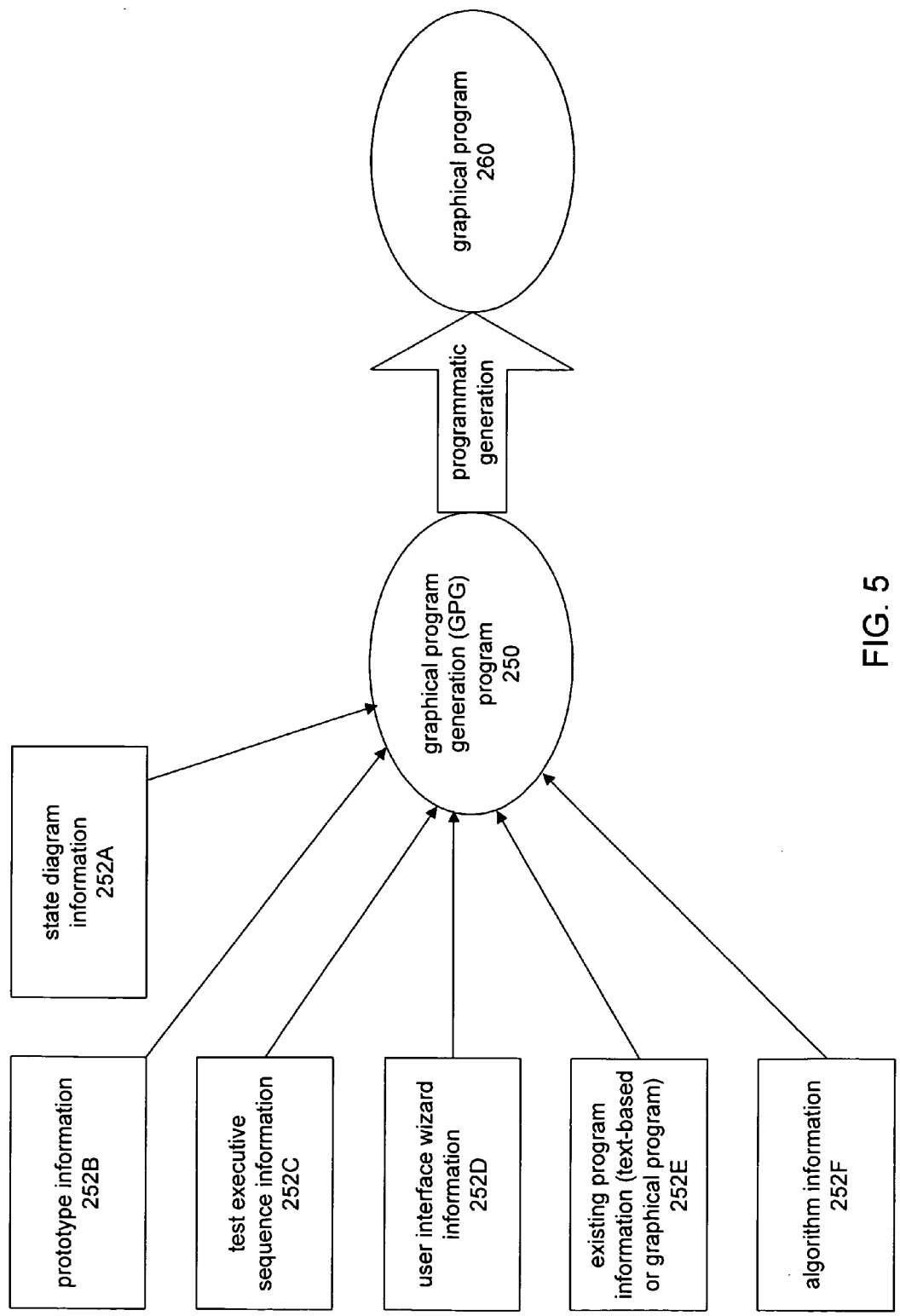
FIG. 5 is a block diagram illustrating that a "GPG program" which programmatically generates a graphical program may be a program for any of various purposes and may receive information of any type to use in generating the graphical program.

FIG. 5—Examples of GPG Programs and Received Information

FIG. 5 is a block diagram illustrating that the GPG program may be a program for any of various purposes and may receive information of any type to use in generating a graphical program. FIG. 5 illustrates a GPG program 250 and various types of program information 252 that the GPG program may receive.

In some embodiments, the GPG program 250 may include or be coupled with a program or application which a user utilizes to construct or characterize a computational process. In response to the specified computational process, the GPG program 250 may programmatically generate a graphical program to implement the computational process.

For example, a state diagram editor may be used to construct a state diagram characterizing a computational process, e.g., in response to user input. As shown in FIG. 5, the GPG program 250 may then receive state diagram information 252A and use this state diagram information to programmatically generate the graphical program. For example, the programmatically generated graphical program may implement functionality specified by the state diagram created by the user.

As another example, the GPG program 250 may include or be coupled with a program or application which a user utilizes to construct a prototype, e.g., in order to characterize an algorithm at a high level. The constructed prototype may be represented as prototype information 252B. In this case, the GPG program 250 may then programmatically generate a graphical program that implements the prototype, based on the prototype information 252B. For more information on programmatically generating a graphical program to implement a prototype, please see U.S. patent application Ser. No. 09/595,003, incorporated by reference above.

As another example, the GPG program 250 may include or be coupled with a program or application which a user utilizes to construct a test executive sequence, e.g., to perform a series of tests on a unit under test. In this case, the GPG program 250 may then programmatically generate a graphical program operable to perform the series of tests when executed, based on test executive sequence information 252C.

In other embodiments, the GPG program 250 may be associated with a program or application that directly aids the user in creating a graphical program. For example, the GPG program 250 may be associated with a graphical programming development environment application. In this case, the GPG program 250 may be operable to receive user input specifying desired functionality, indicated as user interface wizard information 252D in FIG. 5, and may automatically, i.e., programmatically, add a portion of graphical source code to the user's graphical program implementing the specified functionality. For example, the user interface wizard information 252D may be received via one or more "wizard" graphical user interface (GUI) panels or dialogs enabling the user to specify various options. Such graphical program code generation wizards may greatly simplify the user's task of implementing various operations. As an example, it is often difficult for developers of instrumentation applications to properly implement code to analyze an acquired signal, due to the inherent complexity involved. By enabling the developer to specify the desired functionality through a high-level user interface, the developer can quickly and easily request appropriate graphical source code for implementing the signal analysis to be automatically included in the graphical program. Furthermore, since the graphical source code is generated programmatically, the code may be optimized, resulting in an efficient program and a readable block diagram without unnecessary code.

In other embodiments, the GPG program 250 may be operable to automatically translate an existing program into a graphical program. The GPG program may examine the existing program and programmatically generate a graphical program. In one embodiment, the GPG program may include or interface with different front-end plug-in modules, wherein each plug-in module is operable to analyze a particular type of program, e.g., a program written in a particular language or used by a particular development environment, and generate existing program information 252E usable by the GPG program for creating a graphical program that implements functionality of the existing program. The programmatically generated graphical program may perform the same, or substantially the same functionally as, or a subset of the functionality of the existing program.

In one embodiment, the existing program may be a text-based program, such as a C program. In another embodiment, the existing program may itself be a graphical program. For example, although graphical programs created using different graphical programming development environments are similar in some respects, the graphical programs typically cannot be easily transferred across different graphical programming environments for editing or execution. For example, different graphical programming development environments provide different nodes for inclusion in a block diagram, store program files in different formats, etc. Thus, if an existing graphical program associated with one programming environment is desired to be ported to a new programming environment, the GPG program may examine the existing graphical program (or may examine abstract information specifying the existing graphical program) and may programmatically generate a new graphical program associated with the new programming environment.

In another embodiment, the GPG program 250 may be operable to automatically generate a graphical program in response to algorithm information 252F.

In addition to the examples given above, a GPG program 250 may receive any other type of information and programmatically generate a graphical program based on the received information.

It is noted that, in various embodiments, the GPG program 250 may receive the information 252 used in generating the graphical program in any of various ways. The information may be received from the user, from another program, or from other sources, such as a file or database. The information may comprise information of any type, including text or binary information structured in any of various ways. The information may be self-describing, and/or the GPG program may include knowledge of how to interpret the information in order to generate the appropriate graphical program.

As an example, consider a state diagram editor application usable for constructing a state diagram. In this example, the GPG program may be or may be included in the state diagram editor application itself. For example, the state diagram editor application may receive user input specifying state diagram information. The state diagram editor application may then programmatically generate a graphical program to implement functionality specified by the state diagram information, e.g., in response to the user selecting a menu option to generate the graphical program. In other embodiments, the GPG program may be separate from the state diagram editor application. For example, when the user selects the menu option to generate the graphical program, the state diagram editor application may provide the state diagram information to another application, i.e., the GPG program, which then generates the graphical program based on this information. In another embodiment, a user may invoke the GPG program separately and request the GPG program to generate a graphical program, e.g., by specifying a state diagram file. The GPG program may receive the state diagram information in any of various ways formats, e.g., as binary data, XML data, etc.

In most of the examples given above, functionality of the graphical program to be generated is specified explicitly by the received information. For example, a state diagram, user input specified via a wizard interface, a prototype, a test executive sequence, and an existing program, all explicitly specify, to varying degrees, functionality which the graphical program should implement.

It is noted that in other embodiments the received information by itself may not explicitly or inherently specify functionality of the graphical program to be generated. In a case such as this, the functionality of the generated graphical program may be determined mainly by the GPG program. Thus, one embodiment may include different "types" of GPG programs, wherein each type of GPG program is configured to generate graphical programs of a certain type. For example, consider two different GPG programs, program A and program B, which are both operable to receive numeric data from a database and create a graphical program based on the numeric data. Program A may be operable to create a graphical program which, when executed, performs one type of operation on the numeric data, and program B may be operable to create a graphical program which, when executed, performs a different type of operation on the numeric data. Thus, in these examples, the functionality of the graphical program is determined mainly by the GPG program that generates the graphical program.

Thus, in various embodiments, the functionality of the graphical program may be determined by the received program information, and/or the GPG program. In some cases the functionality may be specified almost entirely by the received information. For example, in a case where the GPG program programmatically translates an existing program to a new graphical program, the functionality of the new graphical program may be specified entirely by the existing program. In other cases, the received information and the GPG program may each determine a portion of the functionality. For example, in a case where the GPG program generates a graphical program to implement a test executive sequence, the test executive sequence information may determine the body of the program which includes the code for executing the tests, but the GPG program may be operable to add additional functionality to the graphical program, e.g., by adding code operable to prompt the user for a log file and save test results to the log file, code to display a user interface indicating the current unit under test and the current test being performed, etc.

In a typical case, the implementation of the source code for the graphical program is determined mainly or entirely by the GPG program, although the received information may influence the manner in which the GPG program generates the code, or the GPG program may receive separate information influencing the code generation. For example, consider a GPG program operable to translate an existing graphical program to a new graphical program, e.g., in order to port the existing graphical program to a new programming environment. In one embodiment, the GPG program may be operable to generate the new graphical program in such a way as to match the existing graphical program as closely as possible in appearance. In other words, the new graphical program may be generated so that when the user sees the block diagram of the new graphical program, the block diagram appears substantially the same as the block diagram of the existing graphical program, e.g., in terms of the number of block diagram nodes, the layout and interconnections among the block diagram nodes, etc. In another embodiment, the GPG program may be operable to implement the source code for the new graphical program differently, e.g., by optimizing the code where possible. In this example, the functionality of the generated graphical program may be the same in either case, but the graphical program may be implemented in different ways.

The GPG program may also receive input specifying how to implement the graphical program. For example, in the case above, the user may specify whether or not to perform optimizations when translating an existing graphical program. For example, the new programming environment may support downloading the generated graphical program to a hardware device for execution. If the user desires to download the generated graphical program to a hardware device, e.g., for use in a real-time application, then it may be important to optimize the new program. Otherwise, it may be more important to implement the generated graphical program similarly as the existing graphical program is implemented.

In one embodiment, the GPG program may provide extended support for specifying graphical program code implementation, beyond the ability to specify simple options. For example, the GPG program may support plugins specifying code generation information for various cases. Referring again to the program translation example above, each plug-in may specify how to generate code intended for execution on a particular hardware device. For example, if the generated program is to be run on an FPGA, the generation of the code may be optimized depending on the number of gates available on that particular FPGA.

In various embodiments, an association between a generated graphical program and the received program information used in generating the graphical program may be maintained. For example, after the graphical program has been generated, this association may enable a user to recall the program information or return to an application from which the program information originates, e.g., in order to view or edit the program information. For example, consider a prototyping environment application which enables a user to develop a prototype characterizing an algorithm. The prototyping environment application may programmatically generate a graphical program implementing the developed prototype. The user may then execute the graphical program, and if a problem with the program is discovered, the association may enable the user to return to the prototyping environment application in order to view or modify the prototype used to generate the program. The graphical program may then be programmatically modified or re-generated accordingly.

In one embodiment, a generated graphical program may be "locked", requiring the user to explicitly unlock the program before the program can be modified within the graphical programming environment. Locking the graphical program may facilitate the retrieval or recreation of the program information that was used to generate the graphical program.

In various embodiments, the GPG program may be operable to generate any of various types of graphical programs. For example, as discussed above, a generated graphical program may be targeted toward a particular graphical programming development environment application, e.g., to utilize proprietary features or to create files that are formatted in a manner expected by the graphical programming development environment. Examples of graphical programming development environments include LabVIEW, BridgeVIEW, DasyLab, and DiaDem from National Instruments, VEE from Hewlett Packard, Simulink from The MathWorks, Softwire from Measurement Computing, Inc., Sanscript from Northwoods Software, WiT from Coreco, and Vision Program Manager from PPT Vision, among others.

In various embodiments, the graphical program may be generated using any of various methods or techniques. Generating the graphical program may comprise generating one or more files defining the graphical program. When a user interactively develops a graphical program from within a graphical programming environment, the graphical programming environment may create one or more program files. For example, the program files may specify information such as a set of nodes that the graphical program uses, interconnections among these nodes, programmatic structures such as loops, etc. In other cases, the program files may store various data structures, e.g., in binary form, which the graphical programming environment uses to directly represent the graphical program. Thus, in programmatically generating the graphical program, the GPG program may programmatically generate one or more files representing the graphical program, wherein these files are structured or formatted appropriately for a particular graphical programming environment.

In various cases, a graphical program generated by a GPG program in response to program information may be a fully working program. Thus, the user may load the generated graphical program into the graphical programming environment, execute the program, etc. In other cases, the generated graphical program may not be a complete program. As an example, if an existing program is translated to a graphical program, it may not be possible to translate the entire program. For example, the existing program may utilize functions which do not exist in the graphical programming environment to which the program is to be ported. However, the GPG program may still create a partial graphical program, making it relatively easy for the user to complete the graphical program. In still other cases, it may be desirable to programmatically generate only a graphical code portion, e.g., as discussed above in the case of user interface wizard tools that aid the user in program development.

Figure 6:
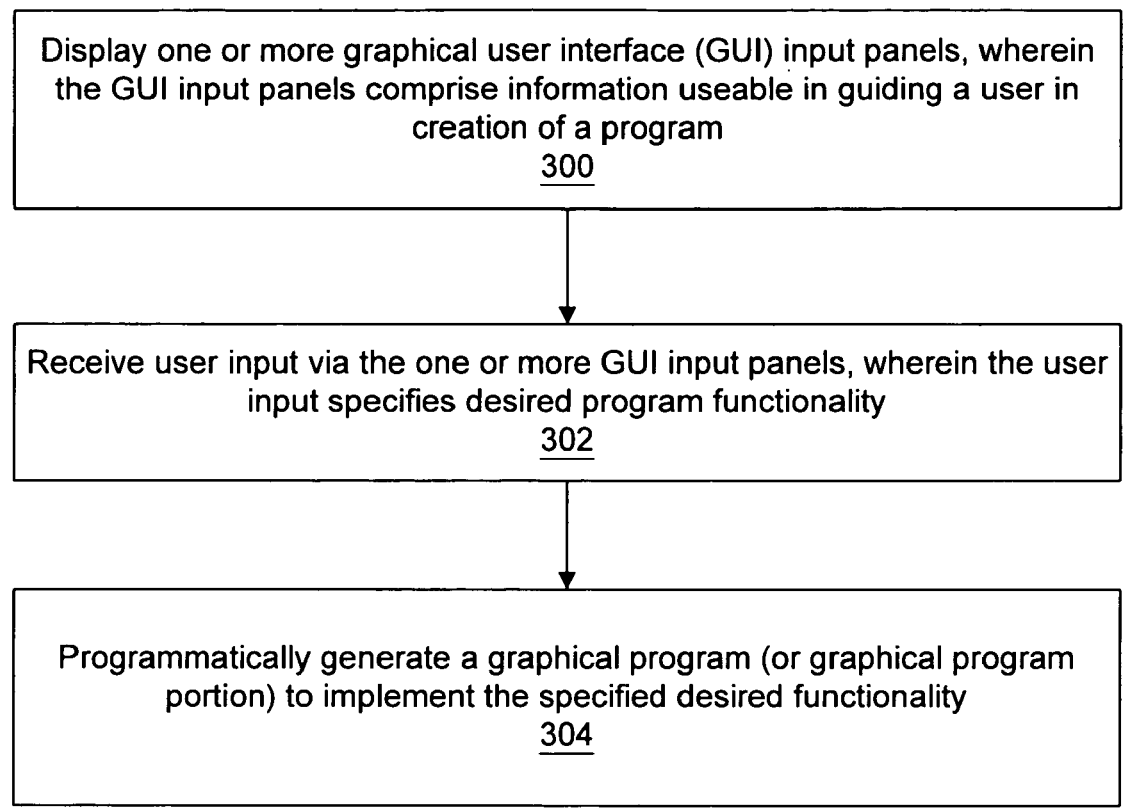
FIG. 6 is a flowchart diagram illustrating one embodiment of a method for programmatically generating a graphical program in response to user input received via a graphical user interface.

FIG. 6—Programmatically Generating a Graphical Program Portion in Response to User Input As discussed above, in one embodiment, a graphical program or portion of a graphical program may be programmatically generated in response to program information received as user input. FIG. 6 is a flowchart diagram illustrating one embodiment of a method for programmatically generating a graphical program in response to user input received via a graphical user interface (GUI). The GUI may be any type of GUI, and the user input may be received via the GUI in any of various ways. In one embodiment, the GUI may comprise one or more GUI input panels. The GUI input panels may take any of various forms, including a dialog box or window, and may include any of various means for receiving user input, such as menus, GUI input controls such as text boxes, check boxes, list controls, etc. The GUI input panels may comprise textual and/or graphical information and may be able to receive textual and/or graphical user input.

In step 300, the GUI may be displayed, e.g., one or more graphical user interface (GUI) input panels may be displayed, wherein the GUI input panels comprise information useable in guiding a user in creation of a program. For example, a GPG program may include various code generation "wizards", i.e., tools that enable a user to specify desired program functionality at a high level via GUI input panels. The GUI input panels may be displayed in response to user input indicating a desire to specify program functionality. For example, the GPG program may provide various menu options for invoking the GUI input panels. As another example, the user may first display a node in a graphical program and may then request to configure functionality for the node, and GUI input panels for configuring functionality of the node may be displayed in response to this request. Exemplary GUI input panels are described below.

In step 302, user input may be received via the one or more GUI input panels, wherein the user input specifies desired program functionality. For example, as described above, the GUI input panels may comprise various GUI input controls such as text boxes, check boxes, list controls, etc., and the user may configure these GUI input controls to indicate the desired program functionality. As an example, consider a case where the GUI input panels enable the user to specify program functionality for generating waveform data. In this example, the GUI input panel may include a list GUI control for choosing whether to generate the data as a sine wave, square wave, etc., a numeric GUI control for specifying the desired amplitude for the wave, a numeric GUI control for specifying the desired frequency for the wave, etc. Thus, in this example, the user input received may specify the desired waveform type, the desired amplitude and frequency, etc.

In step 304, a graphical program (or graphical program portion) to implement the specified desired functionality may be programmatically generated in response to the received user input. Step 304 may comprise programmatically including graphical source code in the graphical program. For example, the programmatically generated graphical source code may comprise a plurality of nodes that are interconnected in one or more of a data flow, control flow, and/or execution flow format, so as to implement the specified functionality. The nodes may have input/output terminals, terminal names, comments, or other aspects that are programmatically generated. Thus, the GPG program may be operable to generate various graphical programs (or portions), depending on the received user input. For example, in the waveform generation example discussed above, the GPG program may include a "sine wave" node in the graphical program if the user specifies to generate sine wave data in step 302 or may include a "square wave" node in the graphical program if the user specifies to generate square wave data.

It is noted that in steps 300 and 302, a plurality of GUI input panels may be displayed, and user input may be received from each of these panels. For example, a first panel may be displayed on the display, wherein the first panel includes one or more first fields adapted to receive first user input specifying first functionality of the graphical program. User input specifying first functionality of the graphical program may be received via the first panel. A second panel may then be displayed for receiving second user input specifying second functionality of the graphical program. In one embodiment, the second panel that is displayed may be based on the first user input. In other words, in one embodiment the GUI input panels may be displayed in a wizard-based manner that guides the user in specifying the desired functionality.

Figure 7:
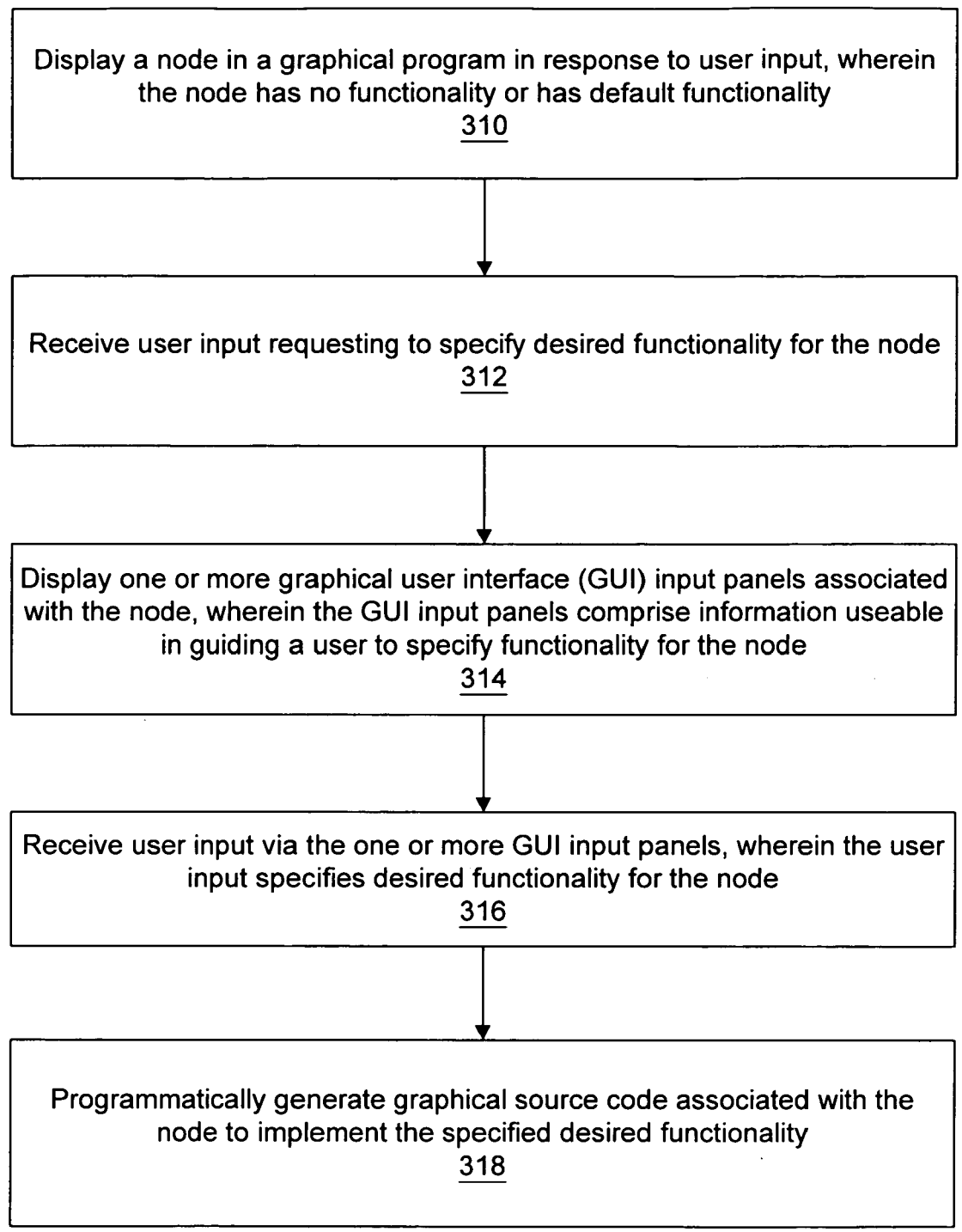
FIG. 7 is a flowchart diagram illustrating one embodiment of a method for programmatically generating graphical source code associated with a particular node.

FIG. 7—Programmatically Generating Graphical Source Code for a Node

FIG. 7 is a flowchart diagram illustrating one embodiment of a method for programmatically generating graphical source code associated with a particular node. The flowchart of FIG. 7 illustrates one embodiment of the method of FIG. 6, in which a graphical program portion is programmatically generated in response to user input.

In step 310, a node may be displayed in a graphical program, wherein the node initially has no functionality or has default functionality. As described below, the node may be able to take on different functionality in the graphical program, depending on configuration user input received. The node may be generally related to a particular functional realm, such as data acquisition, signal analysis, data display, network communications, etc. However, until configuration user input is received for the node, as described below, the exact behavior of the node within the graphical program may be undefined.

In step 312, user input requesting to specify desired functionality or configuration information for the node may be received. For example, the user may double click on the node, execute a menu option for configuring the node, or perform this request in any of various other ways.

In step 314, one or more GUI input panels associated with the node may be displayed in response to the user request received in step 312, wherein the GUI input panels comprise information useable in guiding the user to specify functionality for the node. In step 316, user input specifying desired functionality for the node may be received via the one or more GUI input panels. In other words, the node may be configured to perform a variety of functions within the program, depending on this received user input. As noted above, the node may be generally related to a particular functional realm, such as data acquisition, signal analysis, data display, etc. Thus, the GUI input panels displayed may comprise information related to the particular functional realm. For example, for a node related to network communications, the GUI input panel may comprise GUI controls for configuring the node to specify a data source or target to which to connect, specify a connection protocol, etc.

In step 318, graphical source code may be programmatically generated based on the desired functionality specified in step 316. This graphical source code may be associated with the node in the graphical program, such that the node is operable to implement the desired functionality specified in step 316 when the graphical program is executed. The programmatically generated graphical source code may comprise graphical source code similar to that which a user could create manually in a graphical programming development environment, e.g., by including various function nodes or other types of nodes in the graphical program and connecting the nodes in one or more of a data flow, control flow, and/or execution flow format.

The programmatically generated graphical source code may be associated with the node in various ways. In one embodiment, the graphical source code programmatically generated for the node may replace the node in the graphical program so that the node is no longer visible in the graphical program. However, in the preferred embodiment, the graphical program may still appear the same, even after the graphical source code has been programmatically generated in association with the node. That is, in response to the user input specifying desired functionality for the node, the graphical source code implementing the specified functionality may be generated "behind" the node in a hierarchical fashion, such that the node still appears in the graphical program. In this instance, the graphical source code may be programmatically created as a sub-program (or "sub-VI") of the graphical program, wherein the node represents the sub-program. Generating the portion of graphical source code behind the node in this way may help to keep the graphical program more readable.

The user may choose to view the graphical source code programmatically generated behind the node if desired. For example, in response to using a menu option or double-clicking on the node to view the source code generated behind the node, the programmatically generated graphical source code may be displayed. This may enable the user to modify the programmatically generated source code if desired. However, in one embodiment, the user may be prevented from viewing and/or editing the programmatically generated graphical source code. For example, for a Lite or Express version of a graphical programming development environment product, it may be desirable to prevent users from viewing the programmatically generated graphical source code. This may force the user to control the functionality of the node through the GUI input panel(s) for the node rather than directly modifying the graphical source code. For example, this may help to prevent novice users from becoming confused by seeing more complex graphical source code.

As noted above, in one embodiment, when the node is initially displayed in the program, the node may have no functionality. That is, the node may not initially be operable to perform any function when the graphical program is executed. A traditional function node available for inclusion in a graphical program typically has associated program instructions that are executed when the node is executed in the program. In this case, however, the node displayed in step 310 may not initially have such associated program instructions. Instead, the programmatically generated graphical source code that is associated with the node in step 318 may define the program instructions to be executed for the node. For example, these program instructions may be created from the programmatically generated graphical source code when the graphical program is compiled or interpreted, and these program instructions may be executed when the node is executed in the program.

Also as noted above, in one embodiment, when the node is initially displayed in the program, the node may have default functionality. That is, the node may initially be operable to perform a default function when the graphical program is executed. Thus, the node may have associated program instructions to be executed when the node is executed in the program, or there may be default graphical source code associated with the node when the node is initially included in the graphical program. In this case, the programmatically generated graphical source code that is associated with the node in step 318 may replace the default functionality for the node.

As described above, a node may be configured to perform a plurality of operations, depending on user input specifying configuration information for the node. The configuration information may be received via one or more GUI input panels and may specify one or more desired operations for the node from the plurality of possible operations. However, since the graphical source code associated with the node is generated programmatically, a "minimal" amount of graphical source code may be generated, i.e., only graphical source code necessary to implement the one or more desired operations may be generated. Thus, source code corresponding to operations from the plurality of operations that are not among the one or more desired operations may not be included in the graphical program.

Associating a minimal amount of source code with a graphical program node operable to perform a plurality of operations may have several advantages. For example, by only including graphical source code in the program that is actually used, the program may be significantly more readable. Also, by not including unnecessary code the size of the program can be reduced, which may be important for systems with limited amounts of memory. Also, if the program is to be implemented in a hardware device, e.g., in an FPGA device, then it may be especially important to reduce the program size so that the program may be implemented with a limited amount of hardware resources available on the device.

FIGS. 8–14: Examples

Figure 8:
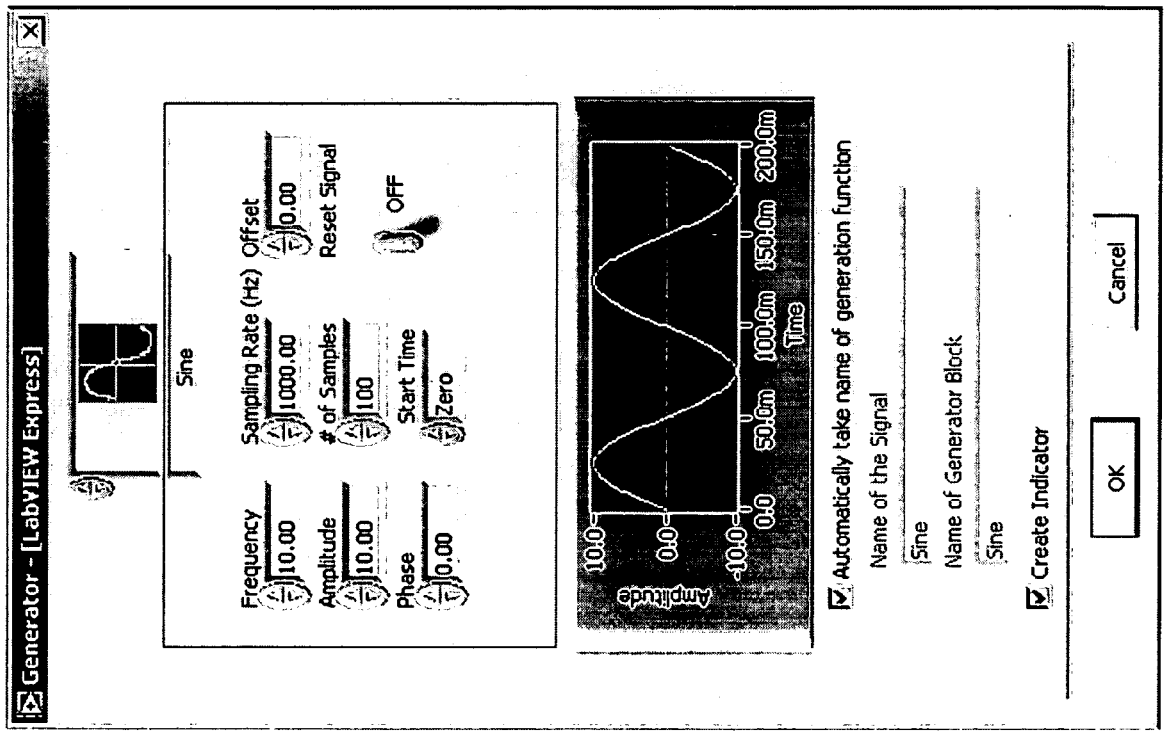
FIG. 8 illustrates an exemplary GUI input panel for configuring a waveform generator node.

As described above with reference to FIG. 7, in one embodiment, the user may first display a node in a graphical program and may then utilize one or more GUI input panels to configure program functionality for the node. FIG. 8 illustrates an exemplary GUI input panel for configuring a waveform generator node. In response to the user specifying different settings for the GUI controls on the GUI input panel, different graphical source code portions may be programmatically generated for the waveform generator node.

Figure 10:
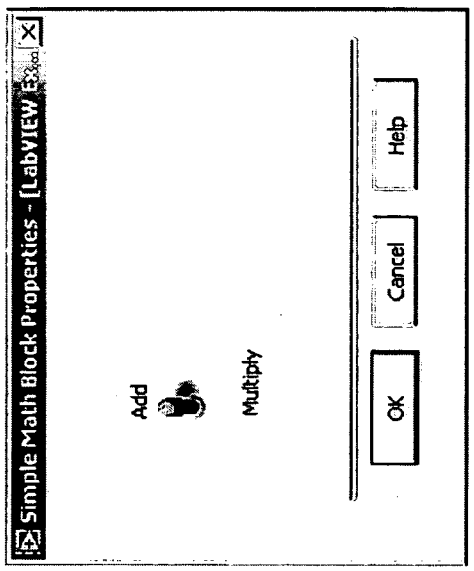
FIGS. 9–14 show a simple example illustrating the concept of programmatically generating different graphical source code portions for a node in response to receiving user input for configuring the node.
Figure 9:
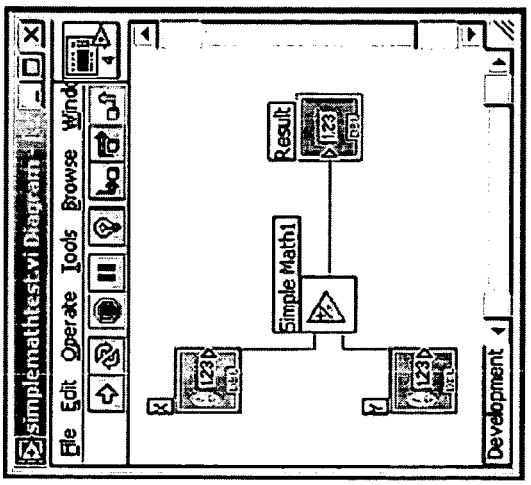

FIGS. 9–14 show a simple example illustrating this concept. FIG. 9 illustrates a graphical program including a "Simple Math" node. FIG. 10 illustrates a GUI input panel for configuring functionality of the Simple Math node. For example, a user may double-click on the Simple Math node or may execute a menu option to display the GUI input panel of FIG. 10. As shown, the user may choose to configure the Simple Math node to perform either an add or a multiply operation.

Figure 12:
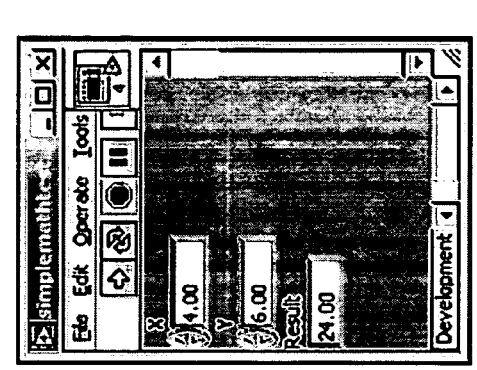
Figure 14:
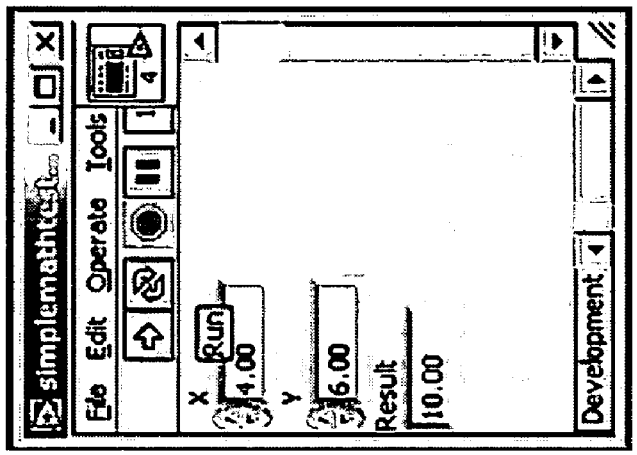

In response to the user input received via the GUI input panel of FIG. 10, different portions of graphical source code may be programmatically generated in the graphical program. If the user chooses the multiply operation, then the graphical source code of FIG. 11 may be programmatically generated; this portion of graphical source code includes a multiplication function node. If the user chooses the add operation, then the graphical source code of FIG. 13 may be programmatically generated; this portion of graphical source code includes an addition function node. FIGS. 12 and 14 illustrate GUI panels for the graphical program that indicate the execution results of the graphical source code of FIGS. 11 and 13, respectively.

Figure 11:
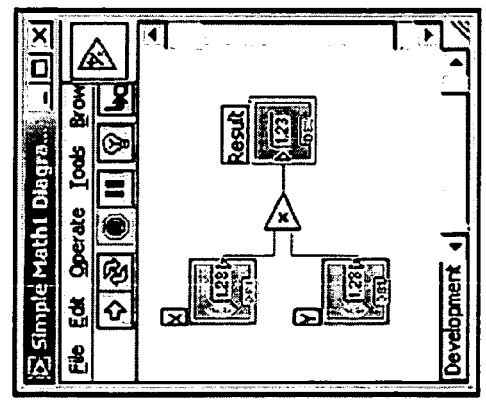
Figure 13:
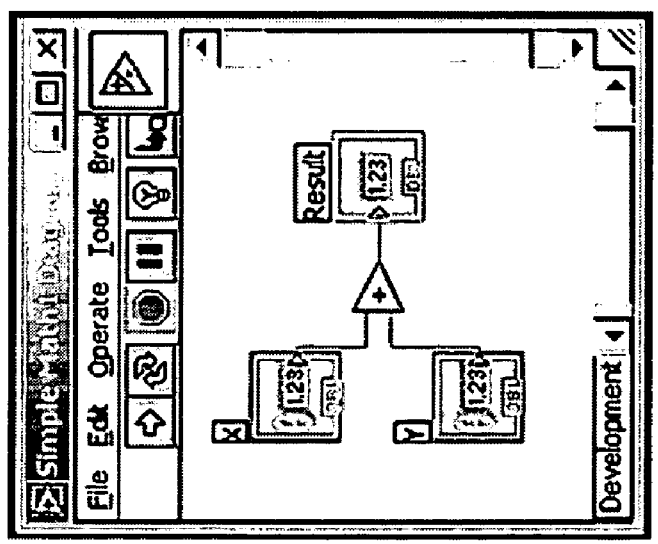

The graphical source code of FIG. 11 illustrates a multiplication node, and the graphical source code of FIG. 13 illustrates an addition node. When the user first includes the Simple Math node in the graphical program, the Simple Math node may not be associated with either one of the multiplication or addition node, or may be associated with a default one of these nodes. In response to the user operating the GUI input panel of FIG. 10, the GPG program (which in this example may be a graphical programming development environment application) may programmatically generate either the multiplication or addition node such that the programmatically generated node is associated with the Simple Math node and in effect replaces the Simple Math node during program execution. However, as described above, the program may still appear to the user as shown in FIG. 9, in which the Simple Math node is shown. That is, the multiplication or addition node may be generated "behind" the Simple Math node. The user may then request to view the graphical source code generated behind the Simple Math node if desired.

FIGS. 9–14 show a very simple example of an operation of configuring program functionality for a node, and it is noted that more complex GUI input panels may be used to create more complex graphical source code portions.

Figure 15:
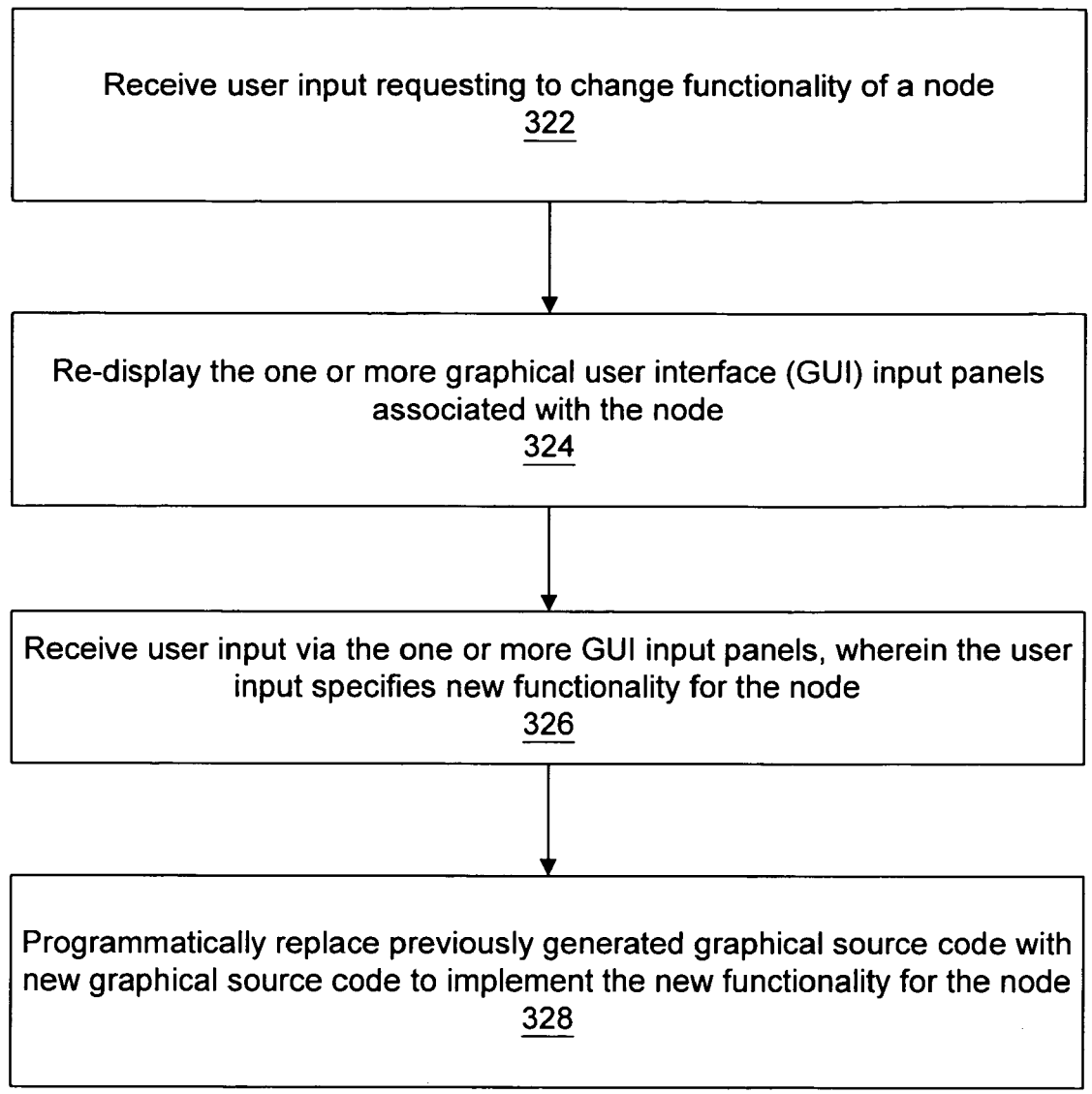
FIG. 15 is a flowchart diagram illustrating one embodiment of a method for programmatically replacing graphical source code associated with a particular node.

FIG. 15—Programmatically Replacing Graphical Source Code for a Node

FIG. 15 is a flowchart diagram illustrating one embodiment of a method for programmatically replacing graphical source code associated with a particular node. As described above with reference to FIG. 7, graphical source code defining functionality for a node may be programmatically generated and associated with the node in response to user input. FIG. 15 illustrates one embodiment of a method for changing the functionality of the node.

In step 322, user input requesting to change functionality of the node may be received. For example, this input may be received similarly as in step 312 of FIG. 7, e.g., by the user double-clicking on the node, executing a menu option for configuring the node, etc.

In step 324, the one or more GUI input panels associated with the node displayed in step 314 may be re-displayed in response to the user request received in step 322. As described above, the GUI input panel(s) may comprise information useable in guiding the user to specify functionality for the node. In this case, the GUI input panels may be used to specify additional or changed functionality for the node.

In step 326, user input specifying new functionality for the node may be received via the one or more GUI input panels. For example, referring again to the waveform generator node example discussed above, if the node was originally configured to generate sine wave data, the GUI input panel(s) may be used to reconfigure the node to generate square wave data.

In step 328, the graphical source code that was previously generated in association with the node may be replaced with new graphical source code that implements the specified new functionality for the node or may be modified to implement the specified new functionality.

It is noted that although the method of FIG. 15 is discussed in terms of replacing graphical source code generated in association with a particular node, a similar method may be employed to replace a graphical program portion generated in accordance with the more general case of the method of FIG. 6.

Figure 16:
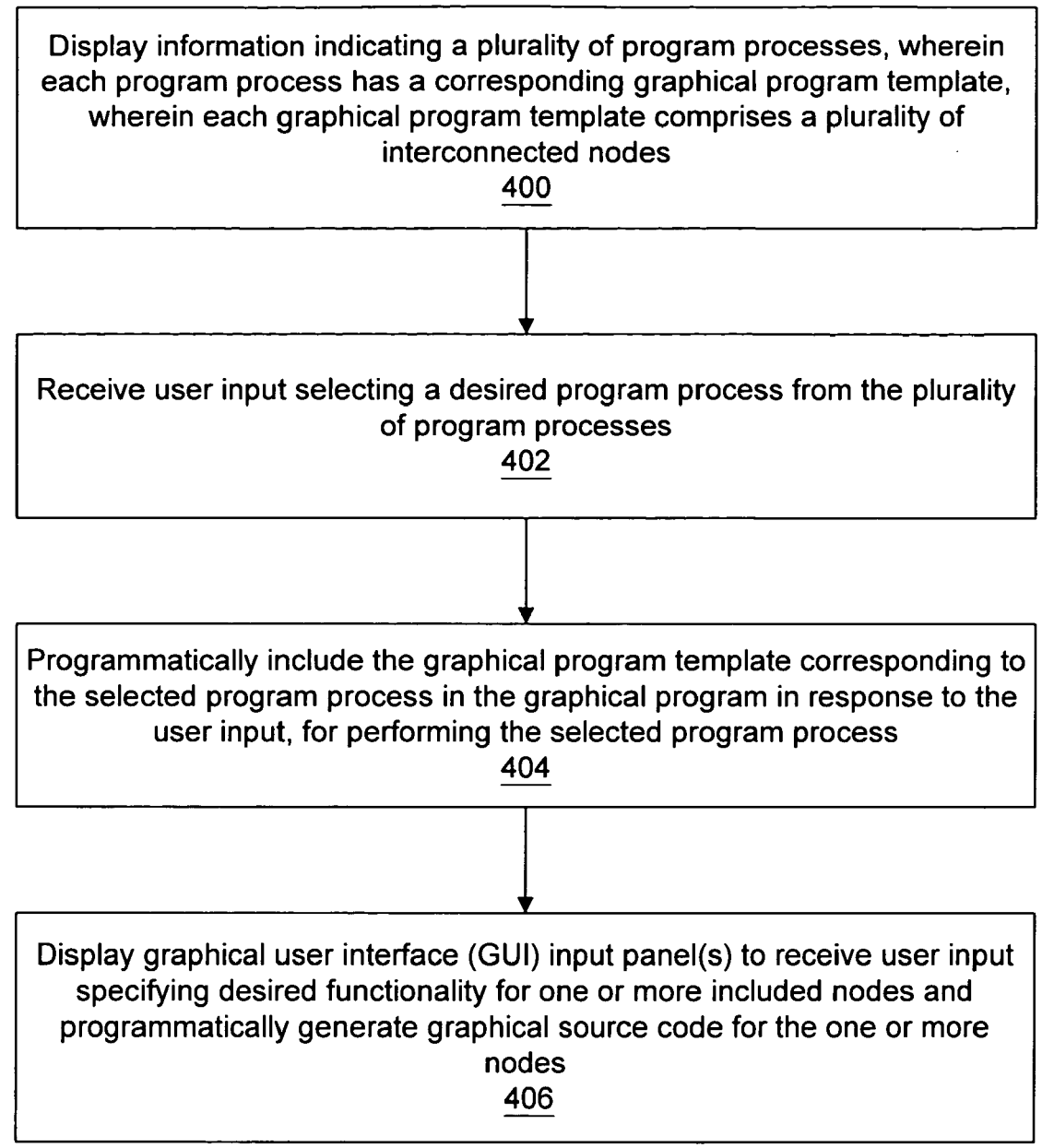
FIG. 16 is a flowchart diagram illustrating one embodiment of a method for creating a graphical program based on a pre-defined program process.

FIG. 16—Graphical Program Solution Library

In many scientific and engineering domains in which computer programs are utilized, problems may be classified into certain general groups. Thus, a particular computer program is often implemented as a specific variation of a more generic program process. Each scientific or engineering domain may have its own paradigmatic program processes.

For example, within the test and measurement and industrial automation fields, program processes often involve receiving input from and/or sending output to hardware devices. One typical program process may be referred to as "Acquire, Process, Display". In other words, a program based on this program process may acquire data from a device or UUT, process the data, and display the data. Another typical program process may be referred to as "Output, Wait, Acquire, Process, Display". In other words, a program based on this program process may output data to a device (e.g., a control signal), wait for a specified period of time (e.g., while the device responds to the control signal), acquire data from the device (e.g., data generated in response to the control signal), process the acquired data, and display the data.

Providing a library of pre-defined program processes on which to base a program may help the user in conceptualizing the problem to be solved and may help the user to implement the desired program more rapidly. However, for each particular program that is based on one of these general program processes, the program typically needs to be customized to perform the desired task. For example, for a program based on the "Output, Wait, Acquire, Process, Display" program process described above, the step of outputting the data to the device may need to be customized to specify the data to be outputted, the device to which to send the data, etc. The other steps may need to be similarly customized.

FIG. 16 is a flowchart diagram illustrating one embodiment of a method for creating a graphical program based on a pre-defined program process. In step 400, information indicating a plurality of program processes may be displayed. The program processes that are displayed may be related to a particular field or discipline and may be organized and displayed in any way desired.

Figure 17:
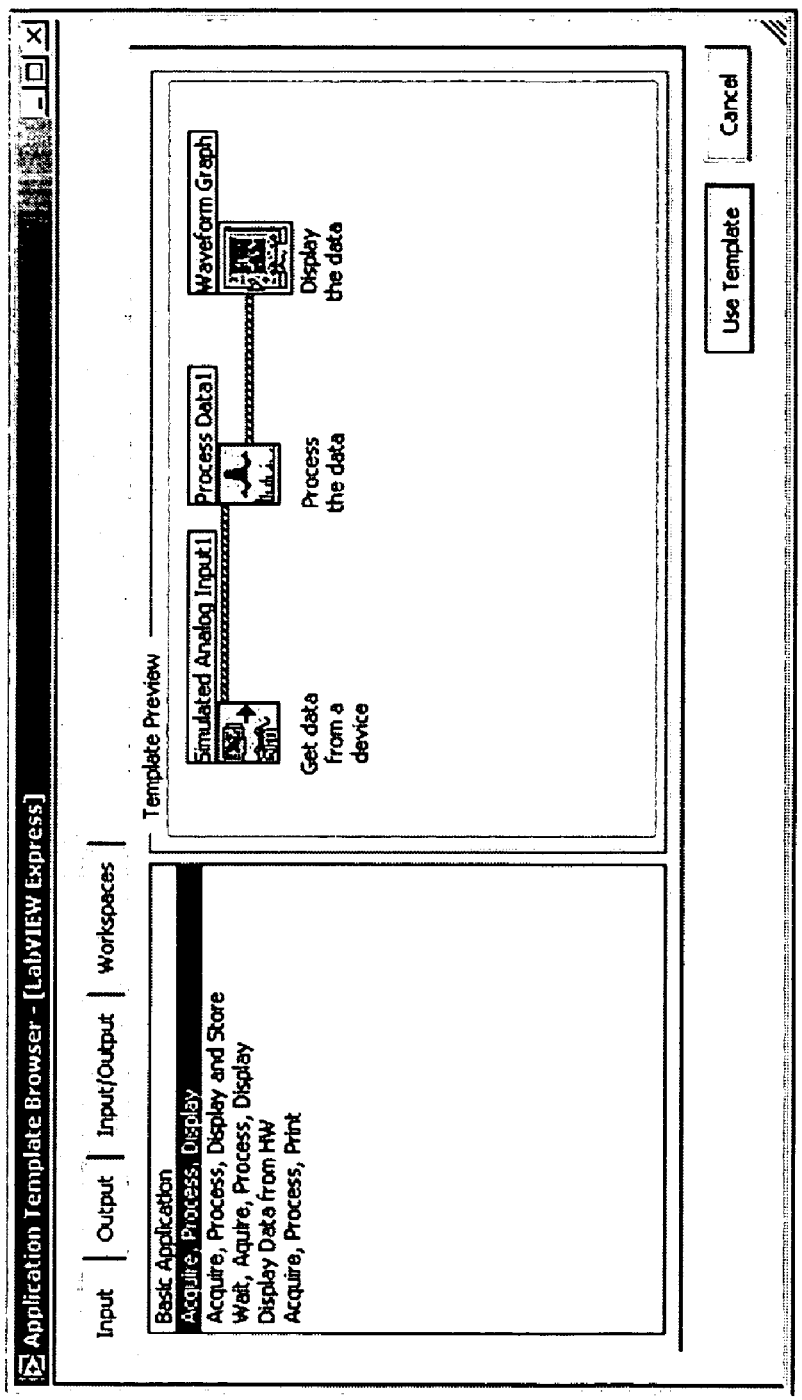
FIGS. 17–19 illustrate exemplary GUI windows for displaying program processes such as those related to the test and measurement and industrial automation fields.
Figure 18:
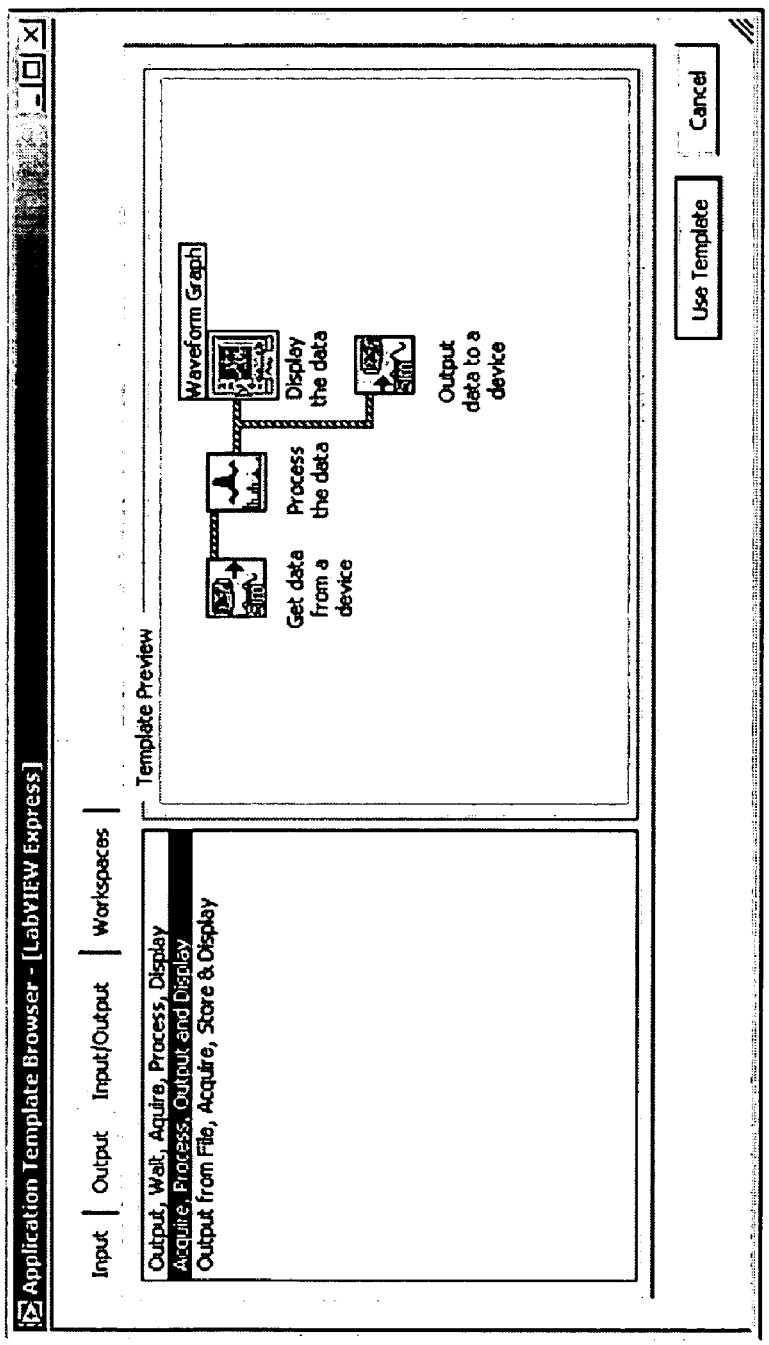
Figure 19:
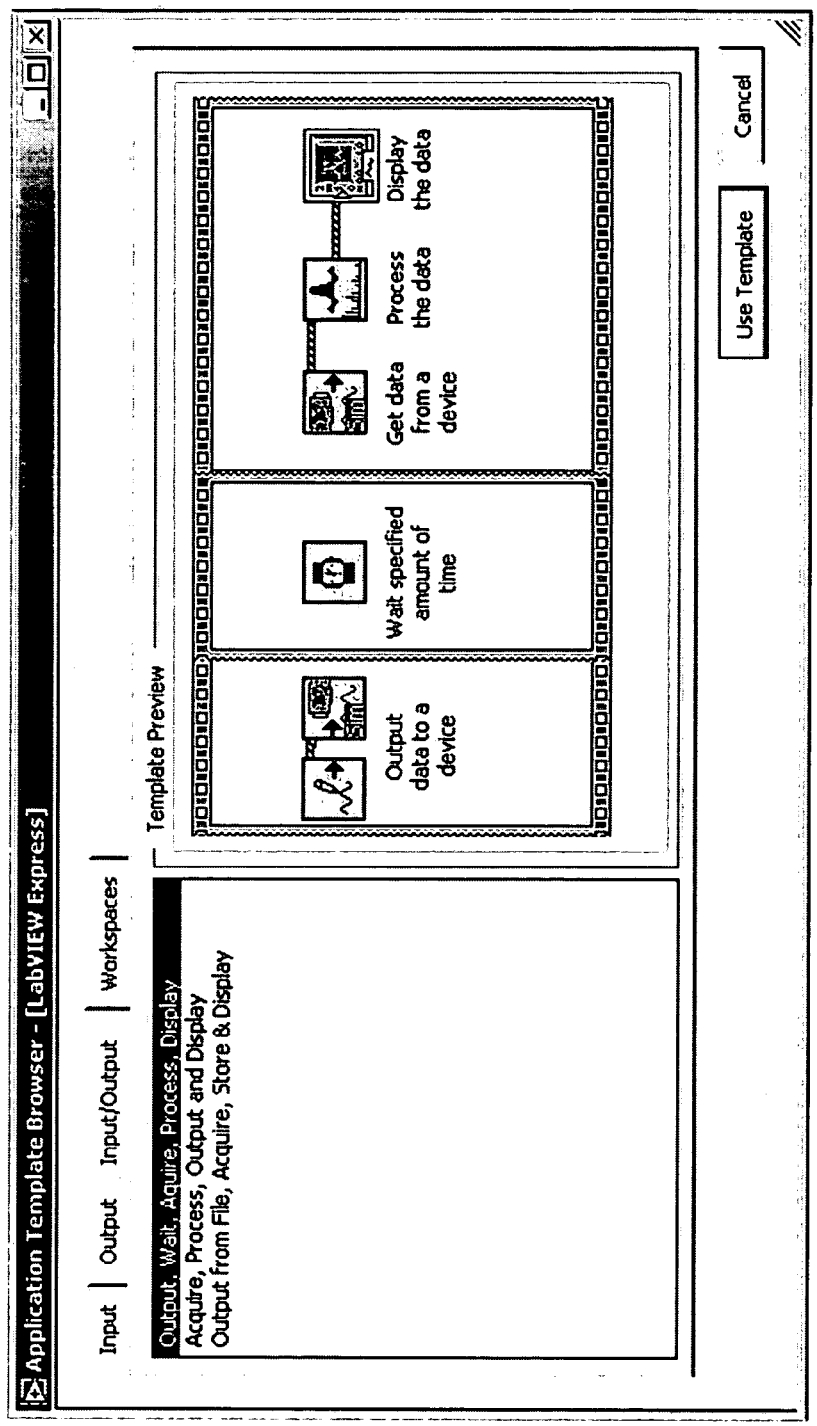

FIGS. 17–19 illustrate exemplary GUI windows for displaying program processes such as those described above related to the test and measurement and industrial automation fields. As shown, the program processes are grouped by whether they are related to input, output, or both. The windows include selectable tabs labeled "Input", "Output", and "Input/Output" to enable the user to choose which program processes to display. FIG. 17 illustrates a window with the "Input" tab selected, and FIGS. 18 and 19 illustrate windows with the "Input/Output" tab selected.

In each window, the available program processes are listed in a list box on the left side of the window. Each program process has a corresponding graphical program template, wherein each graphical program template comprises a plurality of interconnected nodes for implementing the program process. As the user selects a program process in the list box on the left, the corresponding graphical program template is shown on the right side of the window.

In step 402, user input selecting a desired program process from the plurality of available program processes may be received. For example, in the windows described above, the user may select the desired program process in the list box on the left and may then press the "Use Template" button.

In step 404, the graphical program template corresponding to the selected program process may be programmatically included in the graphical program. In other words, the interconnected nodes of the template are programmatically included in the graphical program.

The user may then customize the graphical program to perform the exact process desired. In one embodiment, one or more of the nodes included in the template may be customized according to the method of FIG. 7. In other words, the node(s) may initially have no definite functionality or may have default functionality, and one or more GUI panels may be displayed to receive user input specifying desired functionality for the node(s). Graphical source code to implement the specified functionality may then be programmatically generated and associated with the node(s) as described above, e.g., as sub-programs.

Figure 20:
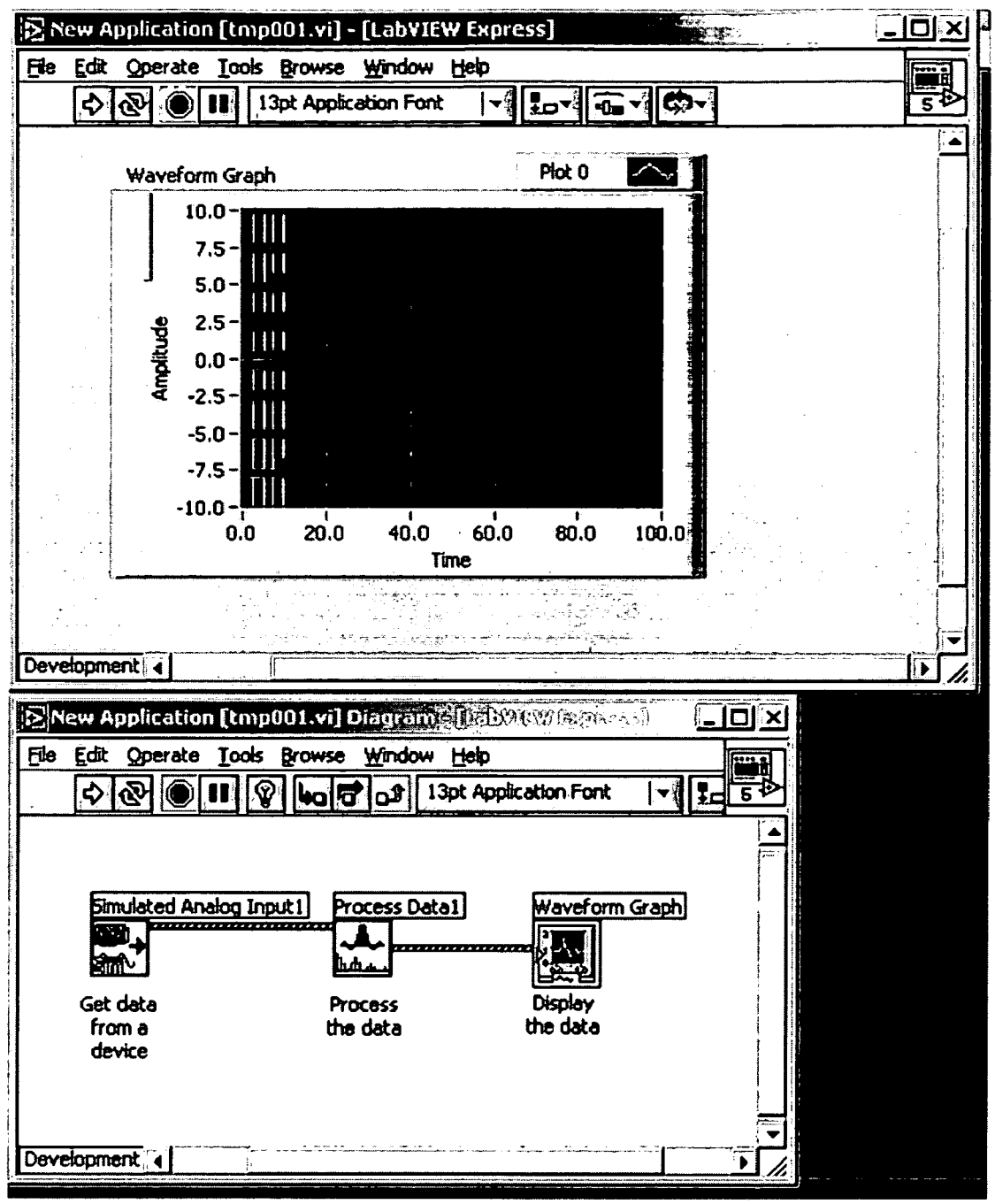
FIG. 20 illustrates a graphical program that was programmatically created based on a pre-defined program process.
Figure 21:
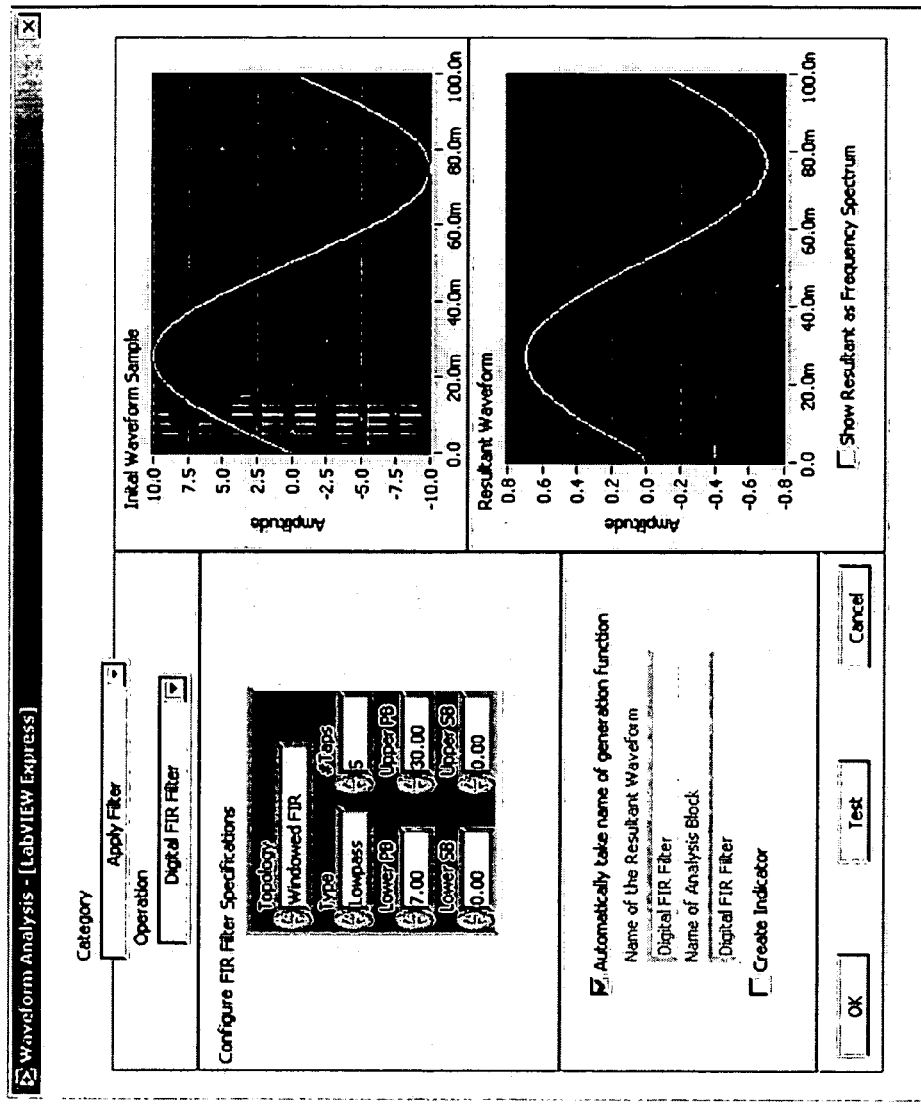
FIG. 21 illustrates a GUI input panel for configuring a node in the graphical program of FIG. 20.

FIG. 20 illustrates an exemplary graphical program which was programmatically created based on the "Acquire, Process, Display" program process described above. FIG. 21 illustrates a GUI input panel for configuring the node labeled "Process the Data", i.e., the node that processes (in this case filters) the data after the data is acquired from the device.

Figure 22:
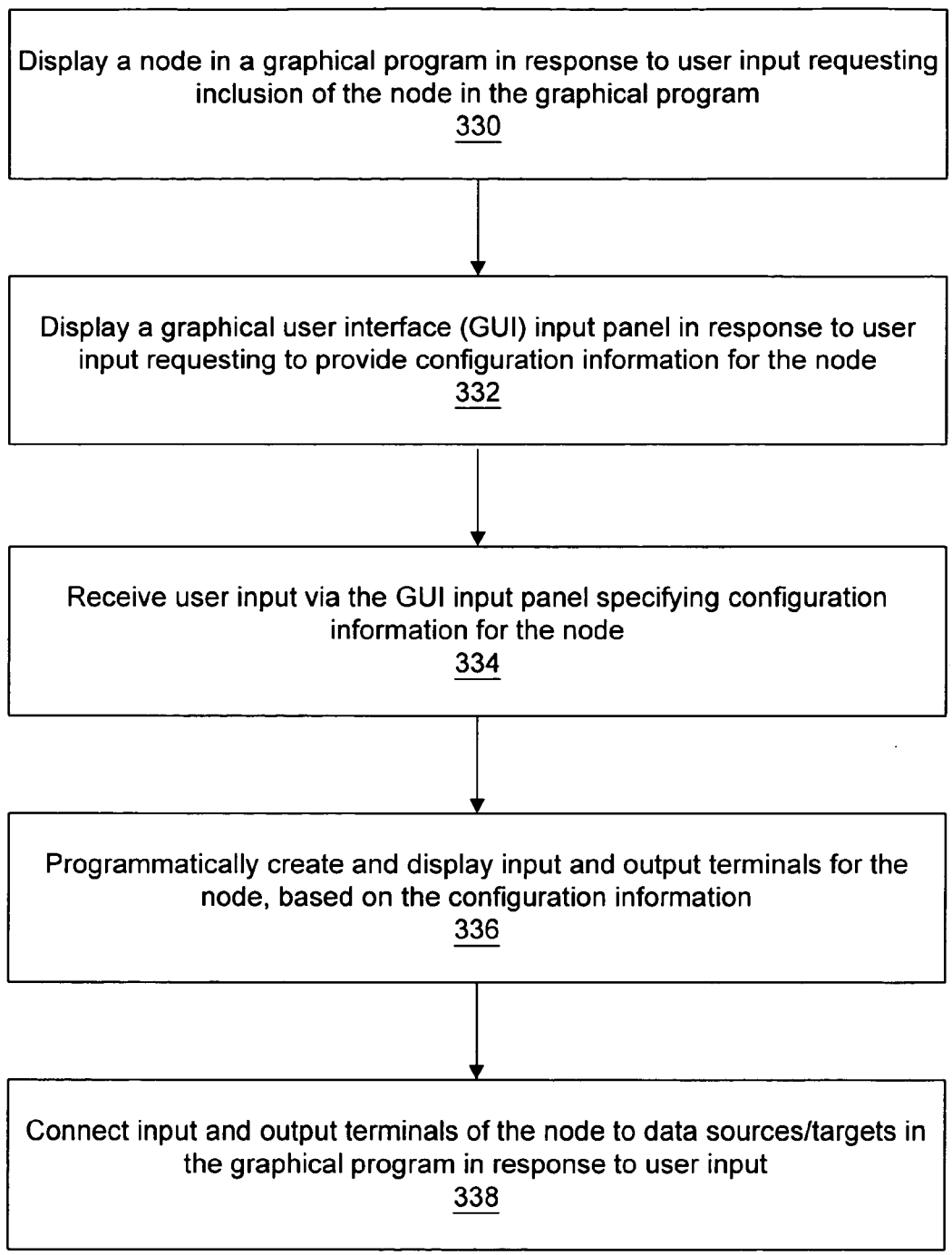
FIG. 22 is a flowchart diagram illustrating one embodiment of an improved method for connecting input/output terminals of a graphical program node to data sources/targets in the graphical program.

FIG. 22—Dynamically Specifying Input/Output Terminals of a Node

As graphical programming development environments have matured and grown more complex, graphical source code has become more feature-packed, and in some cases this has made the graphical programs harder to understand at a glance. One area in which readability problems have occurred is in the area of input/output terminals for graphical program nodes. An input terminal for a node comprises a connection point where the node can receive data from a data source in the graphical program (e.g., from an output terminal of another node). An output terminal for a node comprises a connection point where the node can provide data to a data target in the graphical program (e.g., to an input terminal of another node).

For some graphical program nodes, the number of input/output terminals has become very large so that it can be confusing to the user. As a result, the purpose of each of the various terminals is not always apparent to the user. Also, it is often not clear to the user what combination of terminals needs to be connected to other elements in the program to accomplish the desired task. In many cases, not all of the input/output terminals need to be used. For example, the functional behavior of some nodes can be controlled to a great degree depending on which of a subset of input/output terminals are connected to data sources/targets.

FIG. 22 is a flowchart diagram illustrating one embodiment of an improved method for connecting input/output terminals of a graphical program node to data sources/targets in the graphical program.

In step 330, a node may be displayed in a graphical program, e.g., in response to user input requesting inclusion of the node in the graphical program. For example, the user may select the node from a GUI palette or menu. In one embodiment, when the node is initially displayed, no input/output terminals may appear on the node, or a default set of input/output terminals may appear.

In step 332, one or more GUI input panels may be displayed in response to user input requesting to provide configuration information for the node. For example, the GUI input panel(s) may enable the user to specify desired functionality for the node, similarly as described above. In step 334, user input specifying functionality or other configuration information for the node may be received via the GUI input panel(s).

In step 336, input and/or output terminals for the node may be programmatically created and displayed on the node, based on the configuration information received in step 334. The one or more input/output terminals that are displayed on the node may be a subset of the possible input/output terminals, i.e., a subset that facilitates configuration of the node to accomplish the desired functionality specified in step 334. For example, it may be determined that one or more of the possible input/output terminals for the node are not relevant, depending on the configuration information specified by the user. In this case, the irrelevant terminal(s) may not be displayed on the node; only the terminals needed for accomplishing the desired functionality may be displayed.

In another embodiment, one or more input/output terminals that are relevant may not be displayed, simply to make the graphical program more readable. For example, the method may only display input/output terminals that facilitate an understanding of the functionality performed by the node and may hide other terminals, such as terminals for propagating state or error information.

In step 338, the programmatically created input/output terminals for the node may be connected to data sources/targets in the graphical program in response to user input. Since only relevant terminals may be displayed, the user may have a much better understanding of how to connect the node to other elements of the program. The resulting graphical program may be significantly more understandable.

It is noted that in some graphical programming development environments, input/output terminals for a node are not explicitly displayed at all times. For example, the terminals may not appear until the user moves the mouse cursor over the node. In this instance, "displaying" the programmatically created input/output terminals in step 336 may involve causing the terminals to appear when the user moves the mouse cursor over the node or performs another action causing the terminals to appear.

Figure 23:
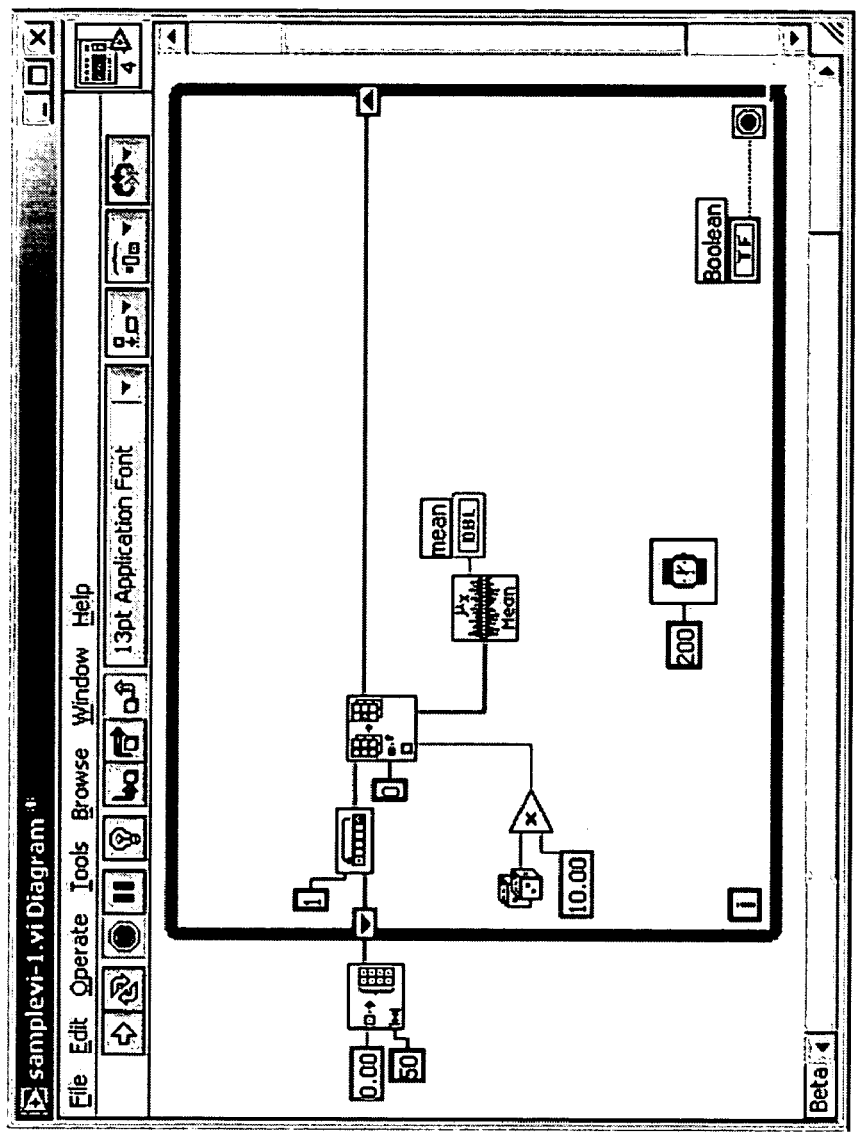
FIG. 23 illustrates a prior art graphical program including various nodes with wires leading to input terminals of the nodes or leading from output terminals of the nodes.

A drawback of the approach of not displaying input/output terminals at all times is that the input/output terminals for the node are not clearly labeled. For example, FIG. 23 illustrates a prior art graphical program including various nodes with wires leading to input terminals of the nodes or leading from output terminals of the nodes. However, it is not clear what the purposes of the input/output terminals are. For example, for a given wire connected to an input terminal of a node, it is difficult to tell at a glance what data that wire provides to the input terminal.

Figure 24:
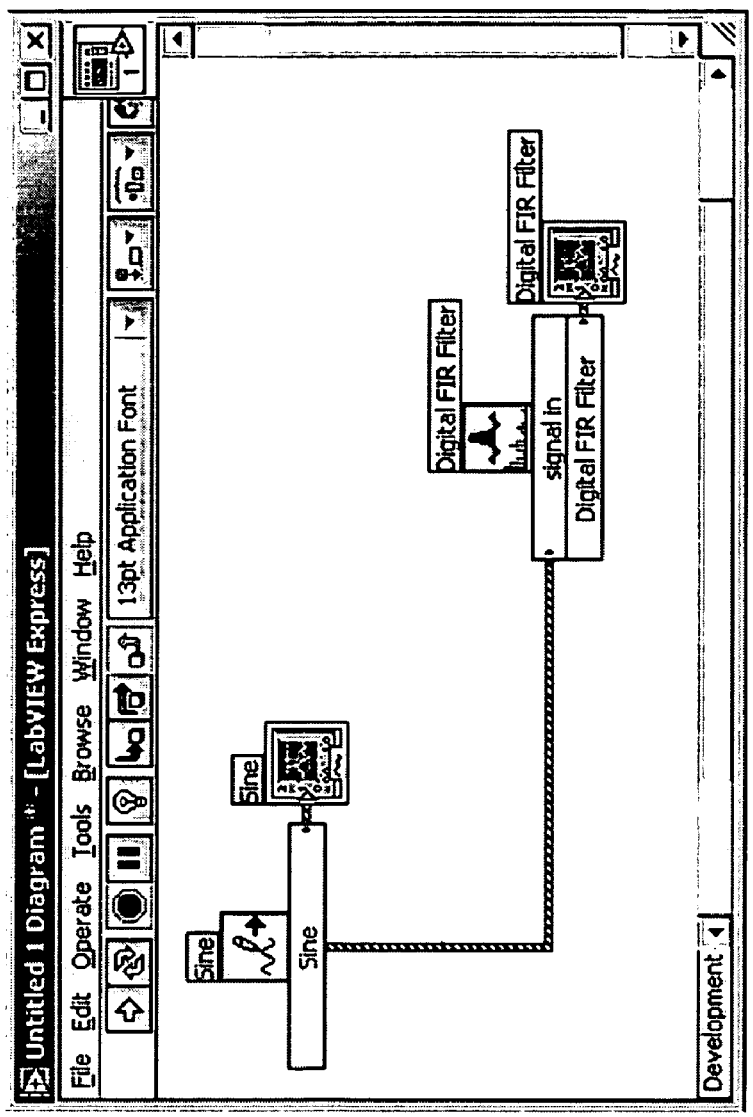
FIGS. 24 and 25 illustrate graphical programs having nodes with terminals displayed as labels under the nodes.
Figure 25:
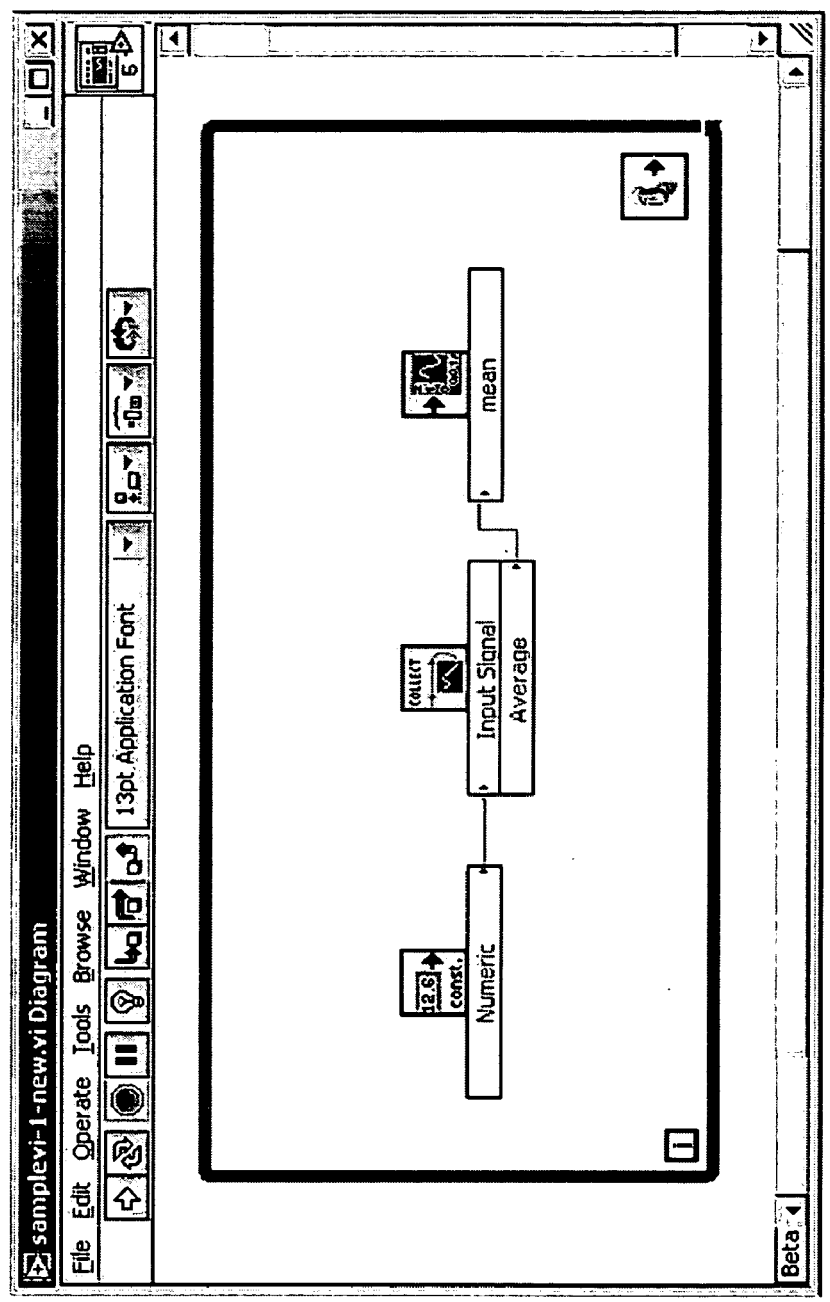

In one embodiment of step 336, the programmatically created input/output terminals for the node may be displayed in such a way as to solve this problem. The input/output terminals may be displayed as labels under the node, as shown in the graphical programs of FIGS. 24 and 25. These labels clearly indicate the purpose of the input/output terminals. To connect an input/output terminal to a data source/target, the appropriate label may be wired to the data source/target, as shown in FIGS. 24 and 25. It is noted that in other embodiments the labels may be placed in other locations besides underneath the nodes, as desired.

It is noted that this method of displaying input/output terminals for nodes in a graphical program as labels under the nodes may be used regardless of whether the input/output terminals are programmatically created based on node configuration information as described above. For example, some graphical programming development environments may not support the above-described method of programmatically creating and displaying a relevant subset of input/output terminals for a node, but may always display all of the possible terminals for the node. In this instance, the terminals may still be displayed as labels under the nodes.

Figure 26:
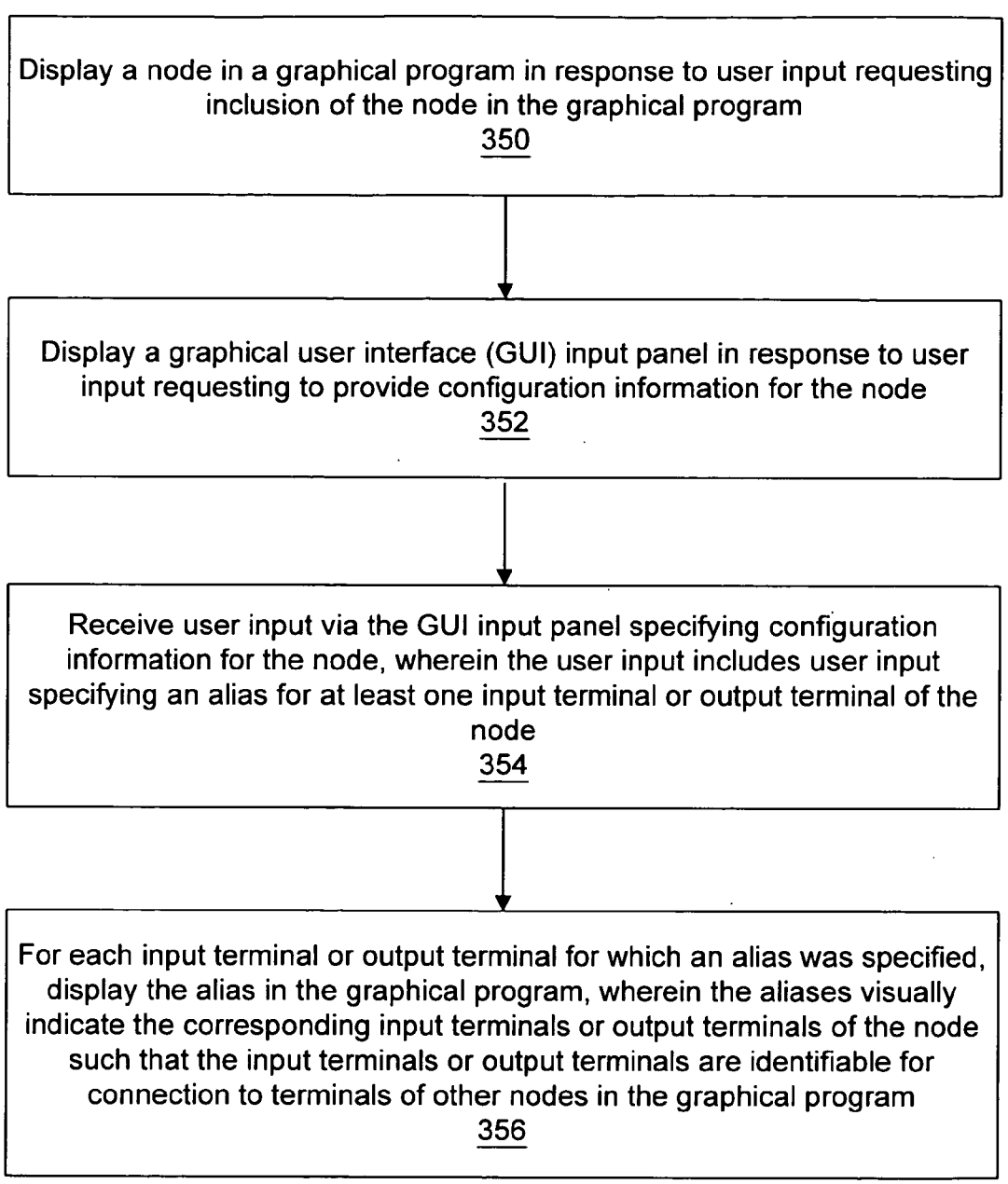
FIG. 26 is a flowchart diagram illustrating one embodiment of a method for specifying an alias for input/output terminals of a node.

FIG. 26—Specifying an Alias for Input/Output Terminals of a Node

Another aspect related to understanding the function of a node pertains to the actual names of the input/output terminals. In the prior art, the user has not been able to change default terminal names. It would be desirable to enable the user to change default terminal names to names that are more meaningful to the user or to the particular program. FIG. 26 is a flowchart diagram illustrating one embodiment of a method for specifying an alias for input/output terminals of a node.

In step 350, a node may be displayed in a graphical program, e.g., in response to user input requesting inclusion of the node in the graphical program. For example, the user may select the node from a GUI palette or menu. The node may initially have input and/or output terminals with default names.

In step 352, one or more GUI input panels may be displayed in response to user input requesting to provide configuration information for the node. For example, the GUI input panel(s) may enable the user to specify desired functionality for the node, similarly as described above, or may enable the user to provide any other type of configuration information for the node. In particular, the GUI input panel(s) may enable the user to specify an alias for one or more input and/or output terminals of the node.

In step 354, user input specifying configuration information for the node may be received via the GUI input panel(s), wherein the user input includes input specifying an alias for at least one input terminal or output terminal of the node. As an example, for a node that includes an input terminal with a default name of "input signal", the user may choose to specify an alias of "voltage", which may be a more meaningful name for the input terminal of the node in the user's particular case.

In step 356, for each input terminal or output terminal for which an alias was specified, the aliases may be displayed in the graphical program. This may involve replacing default terminal names. In one embodiment, the aliases may be displayed as labels under the nodes, similarly as shown in FIG. 25. The user may then connect the input terminals and output terminals to data sources/targets in the graphical program, as described above. The method of FIG. 26 may be combined with other methods described above. For example, with respect to the method of FIG. 23, when input/output terminals for a node are programmatically created, one or more of the terminals may be indicated by a specified alias.

Collector Node Example

One common task that often needs to be performed in a program is to perform various types of numerical functions on a collection of data values. For example, the program may implement a loop in which a data value is received in each iteration of the loop. The program may keep track of the data values that have been received and may numerically analyze the data values, e.g., to compute the average value, the sum of the values, the maximum value, or any other type of analysis or numerical function.

Figure 27:
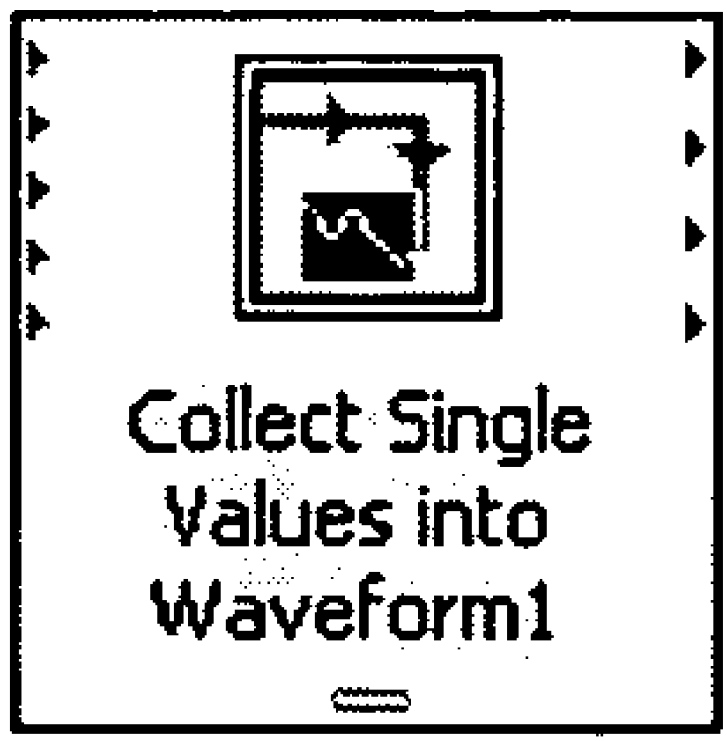
FIGS. 27 and 29 illustrate a node available for inclusion in a graphical program referred to herein as a "collector node"

While simple in concept, in the prior art, this type of behavior has been difficult to implement in a graphical program, in part because it involves keeping track of previously received values. FIG. 27 illustrates a node referred to herein as a "collector node", which simplifies these types of common programming tasks. The collector node is preferably a primitive node provided by a graphical programming development environment for inclusion in a graphical program. The collector node may be operable to maintain state information regarding received data values and may use the state information to determine a data collection on which to perform a numerical function. The data collection comprises at least a subset of data values that have been received by the collector node. As described below, the user may be able to configure the collector mode to determine the data collection in various ways. Exemplary graphical programs that use collector nodes are discussed below. The collector node and these example graphical programs also illustrate exemplary applications of various embodiments of the methods described above.

Figure 28:
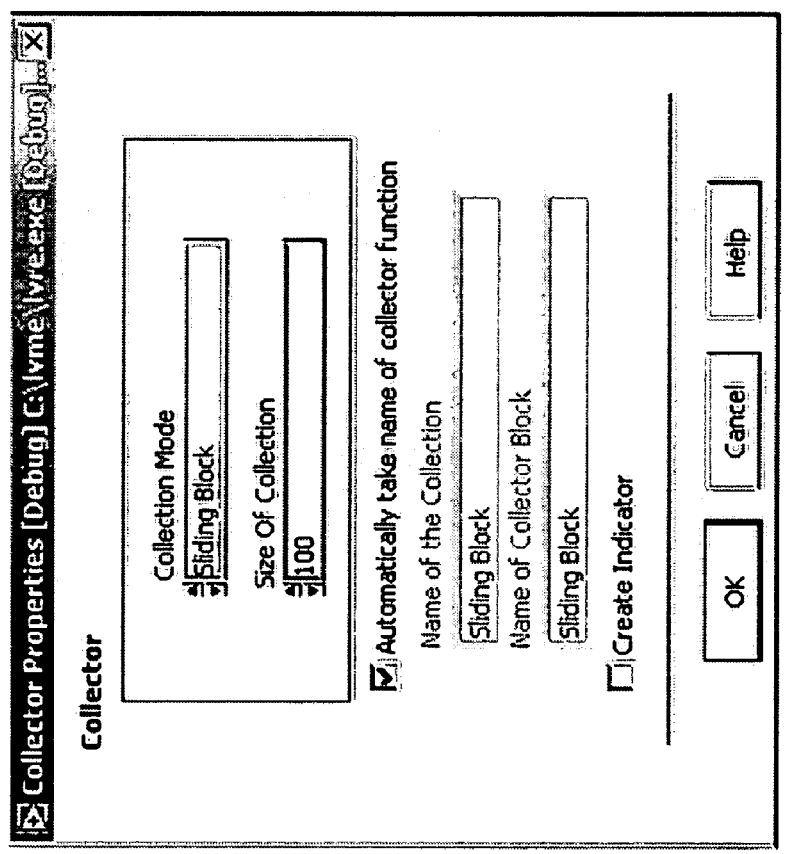
FIG. 28 illustrates an exemplary GUI input panel for configuring the collector nodes shown in FIGS. 27 and 29.

FIG. 28 illustrates an exemplary GUI input panel for configuring the collector node shown in FIG. 27. The GUI input panel includes a field labeled "Collection Mode", which specifies which data values to analyze, referred to below as a data collection. In one embodiment, the possible choices for this field include, "Sliding Block", "Fixed Block", and "Always". If "Sliding Block" or "Fixed Block" are chosen, then a number of data values to track may be specified, as indicated by the "Size of Collection" field.

If "Sliding Block" is chosen, then the data collection becomes valid once the specified number of data values has been received by the collector node. These data values may then be analyzed. From that point on, each time a new data value is received, the oldest data value is removed from the data collection so that the number of data values under analysis remains constant.

If "Fixed Block" is chosen, then the data collection becomes valid once the specified number of data values has been received by the collector node. These data values may then be analyzed. When a new data value is then received, the old data collection is discarded, and data value collection restarts until the specified number of data values has again been received.

If "Always" is chosen, then all data values are tracked, and the analysis is performed on all of these data values, regardless of the number of data values received.

Figure 29:
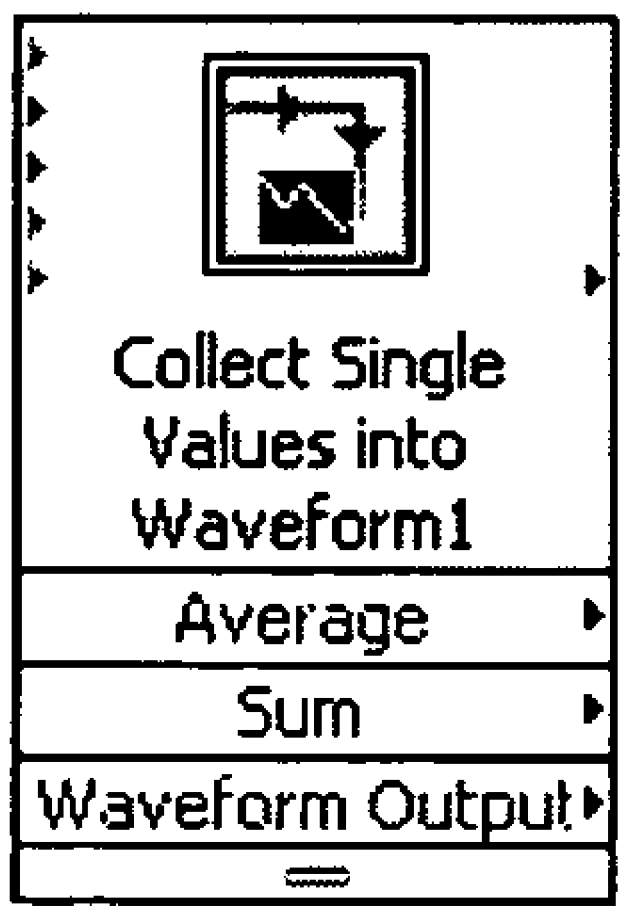

Referring now to FIG. 29, a collector node is shown which includes output terminals labeled as "Average", "Sum", and "Waveform Output". The "Average" output terminal outputs the average value of the data values currently being analyzed (e.g., according to the "Collection Mode" and "Size of Collection" criteria specified in the GUI input panel of FIG. 28). The "Sum" output terminal outputs the sum of the data values currently being analyzed. The "Waveform Output" output terminal outputs the data values themselves as they are received.

In various embodiments, the collector node shown in FIG. 27 may be configured in any of various ways to result in the collector node shown in FIG. 29 with the displayed "Average", "Sum", and "Waveform Output" output terminals. In one embodiment, the user may click on the collector node to view a list of available output terminals and may then select the ones desired to use in the program, and the selected output terminals may be displayed in response. In another embodiment, the desired terminals may be specified through a GUI input panel, as described above with reference to the method of FIG. 23. For example, the GUI input panel of FIG. 28 may be extended to enable the user to specify the outputs of interest.

It is noted that the output terminals shown in FIG. 29 are exemplary only, and in various embodiments, the collector node may implement any of various types of numerical or statistical functions that can be performed on a collection of data values, such as numerical average, sum, maximum value, minimum value, etc. In one embodiment, source code may be programmatically generated in association with the collector node such that only a minimal amount of code is included in the program, similarly as described above. For example, if the user chooses to use an "Average" output terminal but not a "Sum" output terminal, then during execution of the graphical program, the collector node may be operable to maintain a running average of the data values, but not a running sum. If, on the other hand, the user also chooses to use the "Sum" output terminal, then code for maintaining a running sum of the data values may also be associated with the collector node.

Referring again to the GUI input panel of FIG. 28, there is also a field labeled "Name of the Collection". This field enables the user to specify an alias for the output terminal that outputs the actual data values, i.e., the output terminal labeled, "Waveform Output" in FIG. 29. There is also a field labeled "Name of Collector Block" that enables the user to change the name of the collector node as it appears in the graphical program, e.g., to a meaningful name for the particular program. There is also a checkbox enabling the user to select an option titled, "Automatically take name of collector function". If this checkbox is checked, then the collector node's label in the block diagram will be automatically set as a result of using the GUI input panel. For example, if the user selects the "Sliding Block" collection mode, then the collector node's name would be automatically set to "Sliding Block". If the user unchecks this checkbox, then the user can specify another name for the collector node's label.

There is also a checkbox labeled "Create Indicator". If the user checks this checkbox, a user interface indicator for displaying the data values received may be automatically created on a user interface panel for the graphical program. A user interface node corresponding to this indicator may be programmatically created in the block diagram of the graphical program and may be wired to the collector node to receive the data values for display.

Figure 30:
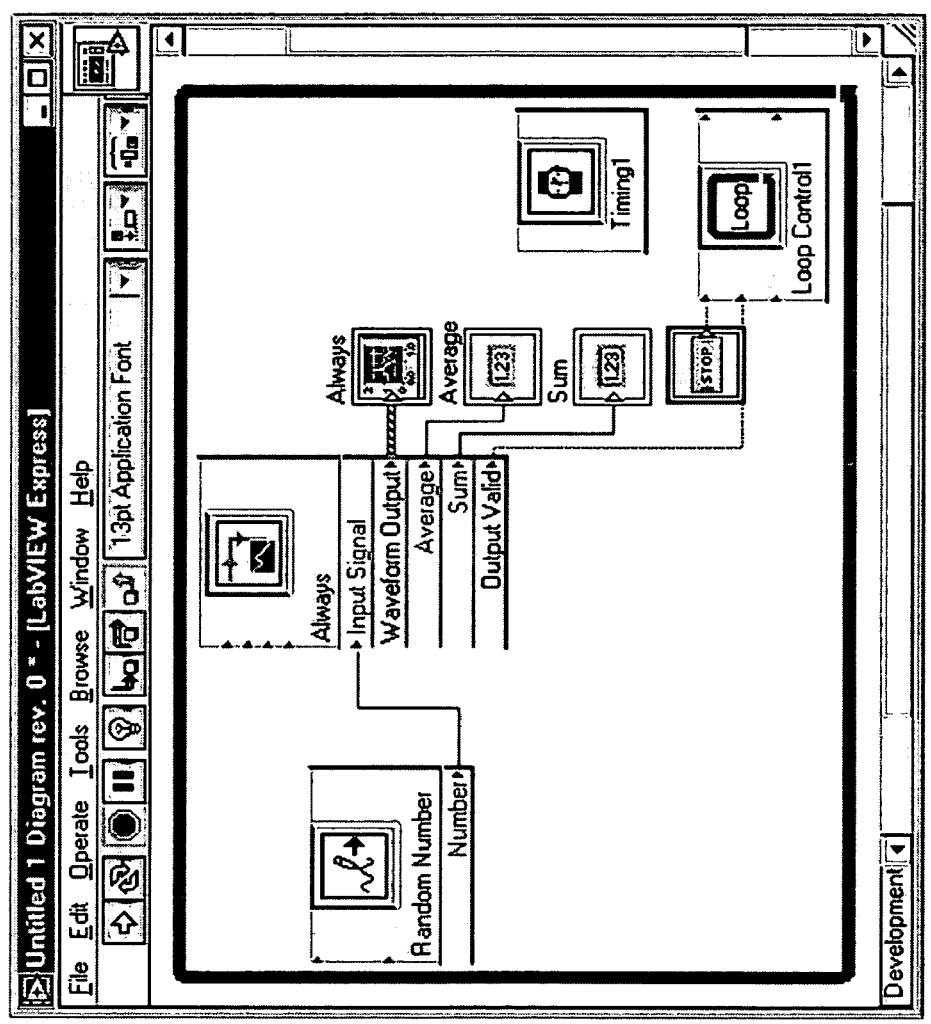
FIGS. 30–33 illustrate exemplary graphical programs using collector nodes.
Figure 31:
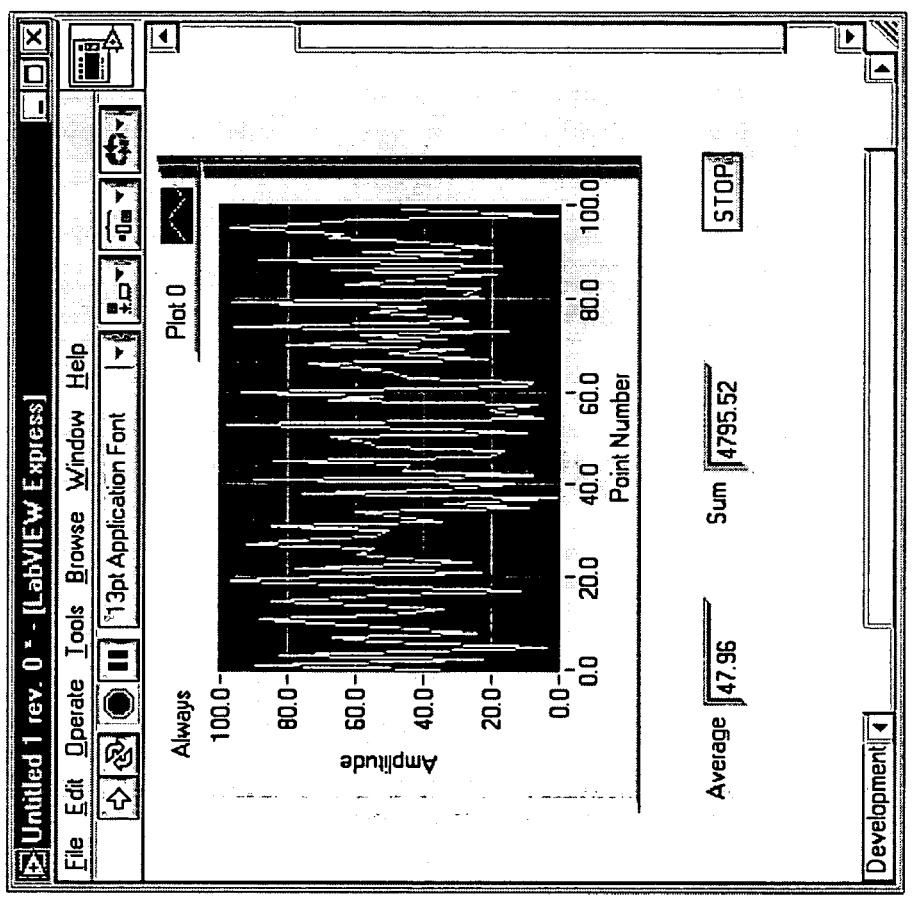

FIG. 30 illustrates an exemplary graphical program block diagram using a collector node. The graphical source code shown is enclosed in a loop. In each iteration of the loop, the node labeled "Random Number" generates a random data value that is passed to the "Input Signal" input terminal of the collector node. As shown, the collector node has various output terminals that are connected to user interface nodes corresponding to user interface indicators that appear on the user interface panel for the graphical program (FIG. 31). The "Waveform Output" output terminal is connected to a waveform graph user interface node that displays the randomly generated data values as a waveform. The "Average" output terminal is connected to a numeric user interface node that displays the average value of all the data values. The "Sum" output terminal is connected to a numeric user interface node that displays the sum of all the data values.

Figure 32:
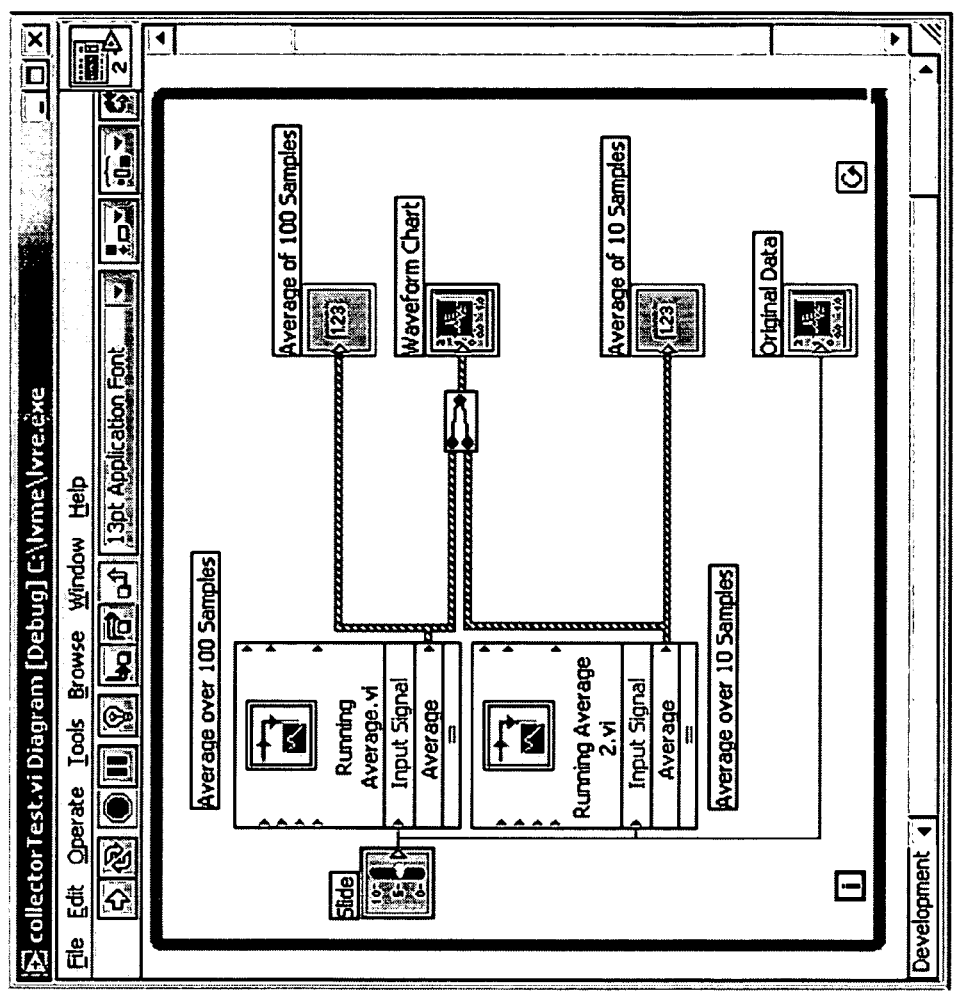
Figure 33:
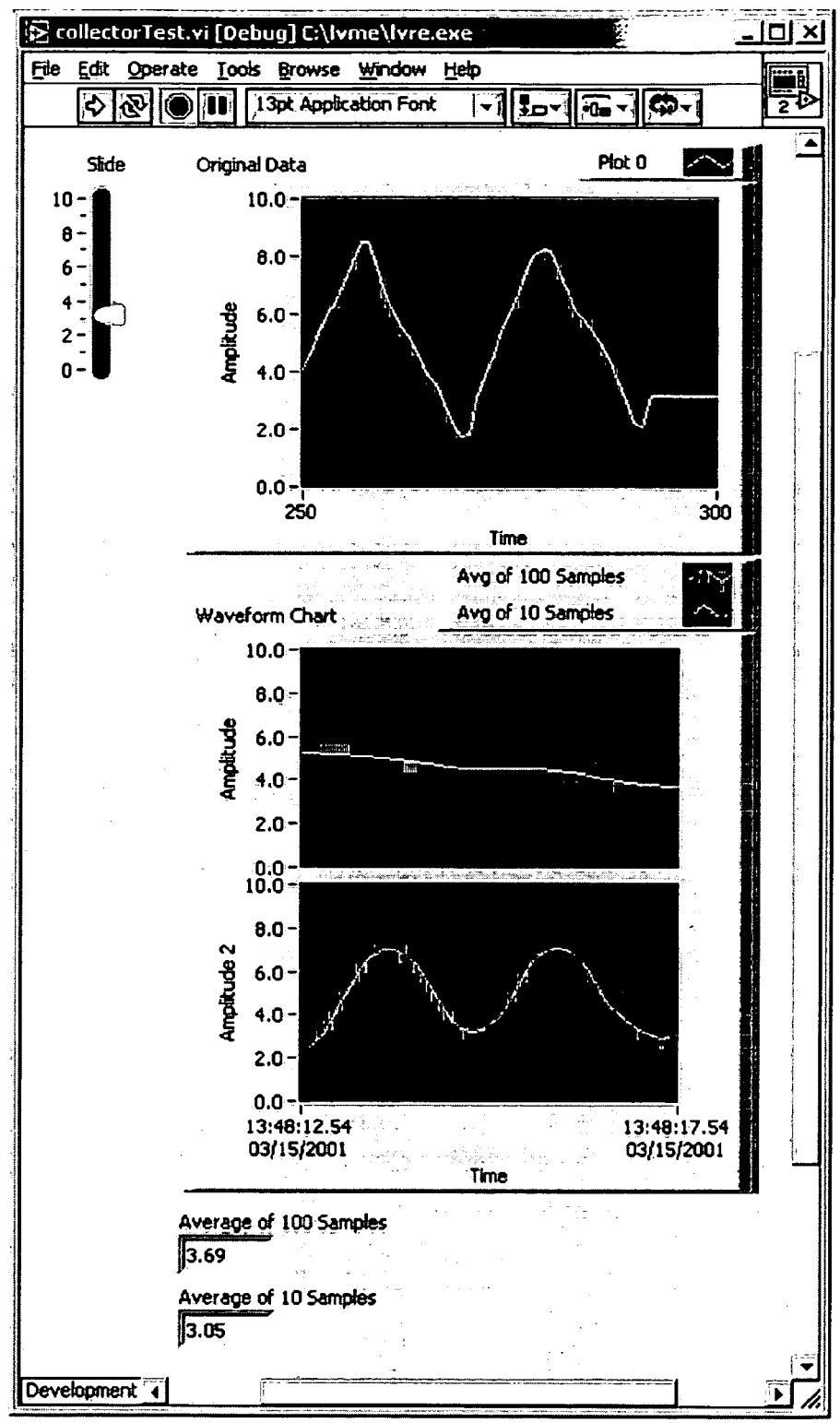
Figure 34:
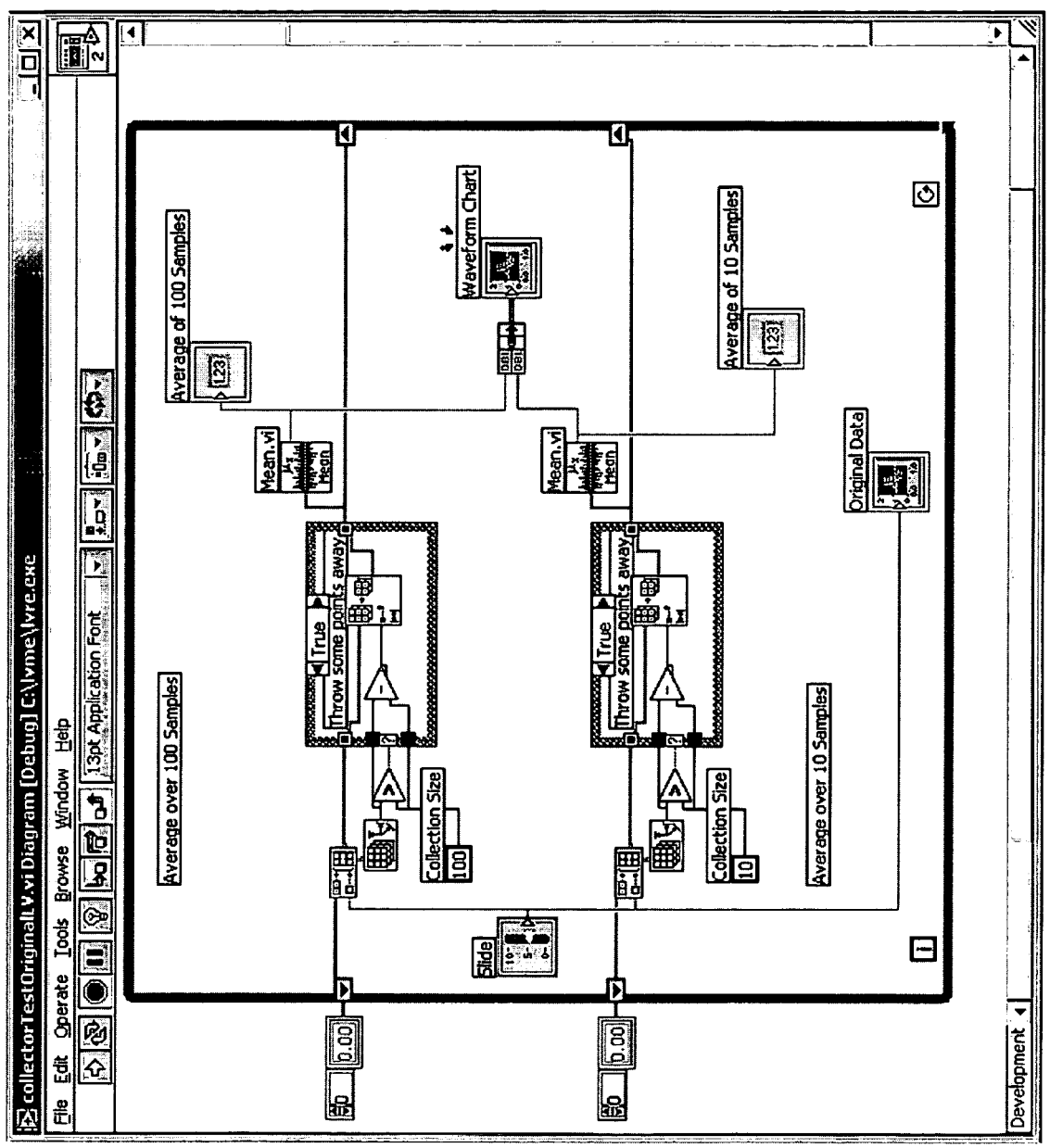
FIG. 34 illustrates a prior art graphical program which does not use a collector node.

FIG. 32 illustrates another exemplary graphical program block diagram using two collector nodes. FIG. 33 illustrates the user interface panel for the graphical program. One collector node is configured to keep a running average of 100 data values, and the other is configured to keep a running average of 10 data values. (In this example, the values are generated as the user moves the "Slide" user interface control on the user interface panel.) The block diagram of FIG. 32 is relatively easy to understand. FIG. 34 illustrates how the same program may be implemented in the prior art. The block diagram of FIG. 34 is significantly less readable than that of FIG. 32.

Implementation of Programmatic Generation

The above-discussed examples of programmatically generating a graphical program or graphical program portion may be implemented in any of various ways. For more information on one embodiment of a system and method for programmatically generating a graphical program, please refer to the above-incorporated patent application titled, "System and Method for Programmatically Generating a Graphical Program in Response to Program Information".

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A computer-implemented method for programmatically generating a graphical program, the method comprising:
    displaying a graphical user interface (GUI) on a display;
    receiving user input to the GUI specifying desired functionality of the graphical program; and
    automatically generating the graphical program in response to the user input specifying the functionality of the graphical program, wherein the graphical program implements the specified functionality;
    wherein the graphical program comprises a block diagram portion comprising a plurality of interconnected nodes, and a graphical user interface portion, wherein the plurality of interconnected nodes visually indicate functionality of the graphical program; and
    wherein said automatically generating the graphical program includes generating the block diagram portion without direct user input specifying the plurality of nodes or connections between the nodes.

2. The method of claim 1,
wherein the GUI comprises information useable in guiding a user in creation of a program.

3. The method of claim 1,
wherein the GUI comprises one or more GUI input panels;
wherein the user input to the GUI comprises user input to each of the one or more GUI input panels.

4. The method of claim 3,
wherein said displaying the GUI and said receiving user input to the GUI comprise:
    displaying a first GUI input panel on the display, wherein the first GUI input panel includes one or more first fields adapted to receive user input specifying first functionality of the graphical program;
    receiving first user input specifying first functionality of the graphical program;
    displaying a second GUI input panel on the display, wherein the second GUI input panel includes one or more second fields adapted to receive user input specifying second functionality of the graphical program;
    receiving second user input specifying second functionality of the graphical program.

5. The method of claim 4,
wherein the second GUI input panel is one of a plurality of possible second GUI input panels, wherein the second GUI input panel is displayed based on the first user input.

6. The method of claim 1,
wherein said automatically generating the graphical program comprises automatically generating a portion of a graphical program.

7. The method of claim 1,
wherein said automatically generating the graphical program creates the graphical program without any user input specifying the new graphical program during said creating.

8. The method of claim 1, wherein said automatically generating the graphical program comprises:
    automatically creating a plurality of graphical program objects in the graphical program; and
    automatically interconnecting the plurality of graphical program objects in the graphical program;
    wherein the interconnected plurality of graphical program objects comprise at least a portion of the graphical program.

9. The method of claim 1, wherein said automatically generating the graphical program comprises:
    automatically creating one or more user interface objects in the graphical program, wherein the one or more user interface objects perform one or more of providing input to or displaying output from the graphical program.

10. The method of claim 1,
wherein the user input received specifies an instrumentation function;
wherein the automatically generated graphical program implements the specified instrumentation function.

11. The method of claim 10,
wherein the instrumentation function comprises one or more of:
a test and measurement function; or
an industrial automation function.

12. The method of claim 1,
wherein said automatically generating the graphical program comprises calling an application programming interface (API) enabling the programmatic generation of a graphical program.

13. The method of claim 1,
wherein said automatically generating the graphical program comprises automatically requesting a server program to generate the graphical program.

14. The method of claim 1, wherein the graphical user interface portion comprises a front panel, wherein the front panel comprises one or more controls and/or one or more indicators.

15. A computer-implemented method for automatically generating a graphical program, the method comprising:
displaying a plurality of GUI input panels on a display, wherein the GUI input panels comprise information useable in guiding a user in creation of a program;
receiving user input to the plurality of GUI input panels, wherein the user input specifies desired functionality of the graphical program; and
automatically generating the graphical program in response to the user input specifying the functionality of the graphical program, wherein the graphical program implements the specified functionality;
wherein the graphical program comprises a block diagram portion comprising a plurality of interconnected nodes, and a graphical user interface portion, wherein the plurality of interconnected nodes visually indicate functionality of the graphical program; and
wherein said automatically generating the graphical program includes generating the block diagram portion without direct user input specifying the plurality of nodes or connections between the nodes.

16. A computer-implemented method for automatically generating a graphical program, the method comprising:
displaying a graphical user interface (GUI) on a display;
receiving user input to the GUI specifying desired functionality of the graphical program;
executing a graphical program generation (GPG) program;
the GPG program receiving the user input, wherein the user input specifies the desired functionality of the new graphical program; and
the GPG program automatically generating the graphical program in response to the user input specifying the functionality of the graphical program, wherein the graphical program implements the specified functionality;
wherein the graphical program comprises a block diagram portion comprising a plurality of interconnected nodes, and a graphical user interface portion, wherein the plurality of interconnected nodes visually indicate functionality of the graphical program; and
wherein said automatically generating the graphical program includes generating the block diagram portion without direct user input specifying the plurality of nodes or connections between the nodes.

17. A computer-implemented method for automatically generating a graphical program, the method comprising:
displaying a graphical user interface (GUI) on a display;
receiving user input to the GUI indicating desired program operation of the graphical program;
executing a graphical program generation (GPG) program;
the GPG program receiving the user input, wherein the user input indicates desired operation of the graphical program; and
the GPG program automatically generating the graphical program in response to the user input indicating the desired operation of the graphical program, wherein the graphical program implements the desired operation;
wherein the graphical program comprises a block diagram portion comprising a plurality of interconnected nodes, and a graphical user interface portion, wherein the plurality of interconnected nodes visually indicate functionality of the graphical program; and
wherein said automatically generating the graphical program includes generating the block diagram portion without direct user input specifying the plurality of nodes or connections between the nodes.

18. The method of claim 17,
wherein the GPG program comprises a graphical programming development environment application.

19. The method of claim 17,
wherein the GPG program is operable to generate a plurality of graphical programs, depending on the received user input.

20. A computer-implemented method for automatically generating a graphical program, the method comprising:
displaying one or more input panels on a display;
receiving user input to the one or more input panels; and
automatically generating graphical source code for the graphical program, based on the received user input;
wherein the graphical program comprises a block diagram portion comprising a plurality of interconnected nodes, and a graphical user interface portion, wherein the plurality of interconnected nodes visually indicate functionality of the graphical program; and
wherein said automatically generating graphical source code for the graphical program includes generating graphical source code for the block diagram portion without direct user input specifying the plurality of nodes or connections between the nodes.

21. The method of claim 20,
wherein the one or more input panels comprise a graphical user interface (GUI) useable in guiding a user in specifying program functionality;
wherein the received user input specifies desired functionality of the graphical program;
wherein the automatically generated graphical source code implements the specified desired functionality.

22. A computer-implemented method for automatically generating a graphical program, the method comprising:
displaying a node in the graphical program in response to user input;
displaying a graphical user interface (GUI) for configuring functionality for the node in response to user input;
receiving user input via the GUI indicating desired functionality for the node; and
automatically including graphical source code associated with the node in the graphical program, wherein the automatically included graphical source code implements the desired functionality, and wherein the graphical source code comprises a plurality of interconnected nodes that visually represent the desired functionality;
wherein said automatically including graphical source code associated with the node in the graphical program comprises automatically including the graphical source code as a sub-program of the graphical program without direct user input specifying the plurality of nodes or connections between the nodes, wherein the node represents the sub-program.

23. A method for configuring a node in a graphical program, the method comprising:
displaying the node in the graphical program;
displaying a graphical user interface (GUI) associated with the node, wherein the GUI comprises information useable in guiding a user in specifying desired functionality for the node;
receiving user input to the GUI specifying desired functionality for the node; and
automatically generating graphical source code associated with the node to implement the specified functionality, wherein the graphical source code comprises a plurality of interconnected nodes that visually represent the desired functionality;
wherein said automatically generating graphical source code associated with the node comprises automatically generating the graphical source code as a sub-program of the graphical program without direct user input specifying the plurality of nodes or connections between the nodes, wherein the node represents the sub-program.

24. The method of claim 23,
wherein no graphical source code is associated with the node until after said automatically generating graphical source code associated with the node.

25. The method of claim 23,
wherein default graphical source code is associated with the node;
wherein said automatically generating graphical source code associated with the node comprises replacing the default graphical source code with the automatically generated graphical source code.

26. The method of claim 23,
wherein no functionality is defined for the node until after said automatically generating graphical source code associated with the node.

27. The method of claim 23,
wherein no program instructions to be executed during execution of the graphical program are associated with the node until after said automatically generating graphical source code associated with the node.

28. The method of claim 23, further comprising:
receiving user input requesting to change functionality of the node, after said automatically generating the graphical source code;
re-displaying the GUI in response to the user input requesting to change functionality of the node;
receiving user input to the GUI specifying new functionality for the node;
automatically replacing the previously generated graphical source code with new graphical source code to implement the new functionality for the node.

29. A memory medium for automatically generating a graphical program, the memory medium comprising program instructions executable to:
display a graphical user interface (GUI) on a display;
receive user input to the GUI specifying desired functionality of the graphical program; and
automatically generate the graphical program in response to the user input specifying the functionality of the graphical program, wherein the graphical program implements the specified functionality;
wherein the graphical program comprises a block diagram portion comprising a plurality of interconnected nodes, and a graphical user interface portion, wherein the plurality of interconnected nodes visually indicate functionality of the graphical program; and
wherein said automatically generating the graphical program includes generating the block diagram portion without direct user input specifying the plurality of nodes or connections between the nodes.

30. The memory medium of claim 29,
wherein the GUI comprises information useable in guiding a user in creation of a program.

31. The memory medium of claim 29,
wherein the GUI comprises one or more GUI input panels;
wherein the user input to the GUI comprises user input to each of the one or more GUI input panels.

32. The memory medium of claim 31, wherein the program instructions executable to display the GUI and the program instructions executable to receive user input to the GUI comprise program instructions executable to:
display a first GUI input panel on the display, wherein the first GUI input panel includes one or more first fields adapted to receive user input specifying first functionality of the graphical program;
receive first user input specifying first functionality of the graphical program;
display a second GUI input panel on the display, wherein the second GUI input panel includes one or more second fields adapted to receive user input specifying second functionality of the graphical program;
receive second user input specifying second functionality of the graphical program.

33. The memory medium of claim 32,
wherein the second GUI input panel is one of a plurality of possible second GUI input panels, wherein the second GUI input panel is displayed based on the first user input.

34. The memory medium of claim 29,
wherein said automatically generating the graphical program creates the graphical program without any user input specifying the new graphical program during said creating.

35. The memory medium of claim 29, wherein the program instructions executable to automatically generate the graphical program comprise program instructions executable to:
automatically create a plurality of graphical program objects in the graphical program; and
automatically interconnect the plurality of graphical program objects in the graphical program;
wherein the interconnected plurality of graphical program objects comprise at least a portion of the graphical program.

36. The memory medium of claim 29,
wherein the user input received specifies an instrumentation function;
wherein the automatically generated graphical program implements the specified instrumentation function.

37. The memory medium of claim 36,
wherein the instrumentation function comprises one or more of:
a test and measurement function; or
an industrial automation function.

38. The memory medium of claim 29, wherein the graphical user interface portion comprises a front panel, wherein the front panel comprises one or more controls and/or one or more indicators.

39. A memory medium for configuring a node in a graphical program, the memory medium comprising program instructions executable to:
 display the node in the graphical program;
 display a graphical user interface (GUI) associated with the node, wherein the GUI comprises information useable in guiding a user in specifying desired functionality for the node;
 receive user input to the GUI specifying desired functionality for the node; and
 automatically generate graphical source code associated with the node to implement the specified functionality, and wherein the graphical source code comprises a plurality of interconnected nodes that visually represent the desired functionality;
 wherein said automatically generating graphical source code associated with the node comprises automatically generating the graphical source code as a sub-program of the graphical program without direct user input specifying the plurality of nodes or connections between the nodes, wherein the node represents the sub-program.

40. The memory medium of claim 39,
 wherein no graphical source code is associated with the node until after said automatically generating graphical source code associated with the node.

41. The memory medium of claim 39,
 wherein default graphical source code is associated with the node;
 wherein said automatically generating graphical source code associated with the node comprises replacing the default graphical source code with the automatically generated graphical source code.

42. The memory medium of claim 39, further comprising program instructions executable to:
 receive user input requesting to change functionality of the node, after said automatically generating the graphical source code;
 re-display the GUI in response to the user input requesting to change functionality of the node;
 receive user input to the GUI specifying new functionality for the node;
 automatically replace the previously generated graphical source code with new graphical source code to implement the new functionality for the node.

* * * * *